US010706473B2

(12) United States Patent
Vaidyanathan et al.

(10) Patent No.: US 10,706,473 B2
(45) Date of Patent: Jul. 7, 2020

(54) SYSTEMS AND METHODS FOR CUSTOMIZING A PORTFOLIO USING VISUALIZATION AND CONTROL OF FACTOR EXPOSURE

(71) Applicant: Optimal Asset Management, Los Altos, CA (US)

(72) Inventors: Vijay Vaidyanathan, Los Altos, CA (US); Himanshu Monty Joshi, Los Altos, CA (US); Daniel Mantilla Garcia, Los Altos, CA (US); Andrew Ang, Los Altos, CA (US); Helmut Hissen, Los Altos, CA (US)

(73) Assignee: Optimal Asset Management, Los Altos, CA (US)

( * ) Notice: Subject to any disclaimer, the term of this patent is extended or adjusted under 35 U.S.C. 154(b) by 356 days.

(21) Appl. No.: 14/715,568

(22) Filed: May 18, 2015

(65) Prior Publication Data
US 2016/0343078 A1 Nov. 24, 2016

(51) Int. Cl.
*G06Q 40/06* (2012.01)
(52) U.S. Cl.
CPC .................................. *G06Q 40/06* (2013.01)
(58) Field of Classification Search
CPC ........ G06Q 40/06; G06Q 40/04; G06Q 40/00; G06F 3/04815
USPC ...................................................... 705/35, 30
See application file for complete search history.

(56) References Cited

U.S. PATENT DOCUMENTS

| 3,829,838 A | * | 8/1974 | Lewis | G02B 27/2271 |
| | | | | 345/419 |
| 5,021,976 A | * | 6/1991 | Wexelblat | G06F 3/04817 |
| | | | | 345/581 |
| 5,041,992 A | * | 8/1991 | Cunningham | G06F 8/38 |
| | | | | 345/441 |
| 5,675,746 A | * | 10/1997 | Marshall | G06F 3/04815 |
| | | | | 705/35 |
| 5,799,287 A | | 8/1998 | Dembo | |
| 5,893,079 A | * | 4/1999 | Cwenar | G06Q 40/00 |
| | | | | 705/35 |

(Continued)

FOREIGN PATENT DOCUMENTS

WO WO-0133402 A2 * 5/2001 ............. G06Q 40/08

OTHER PUBLICATIONS

Mesomeris, S., "Risk Premia in Asset Allocation", CFA UK Annual Conference, Jun. 20, 2013, pp. 6-5.*

(Continued)

*Primary Examiner* — Daniel S Felten
(74) *Attorney, Agent, or Firm* — Polsinelli LLP

(57) ABSTRACT

Systems and methods for customizing a portfolio using visualization and control of factor exposures are disclosed. Assets are selected for inclusion in factor portfolios from a universe of assets based on risk premia factor scores. The factor portfolios can be combined into blended portfolios having varying degrees of factor exposures using simple visual controls for adjusting relative proportions of the factor portfolios. Any one of the individual factor portfolios and the resulting blended portfolio can be evaluated by comparing its performance against a benchmark portfolio or across a number of regimes representing various market or economic conditions or factor-specific regimes.

16 Claims, 24 Drawing Sheets

System 10

(56) References Cited

U.S. PATENT DOCUMENTS

| | | | |
|---|---|---|---|
| 5,911,045 A * | 6/1999 | Leyba | G06F 3/0481 709/204 |
| 6,064,984 A * | 5/2000 | Ferguson | G06Q 40/00 705/35 |
| 6,064,985 A * | 5/2000 | Anderson | G06Q 40/06 705/36 R |
| 6,134,535 A * | 10/2000 | Belzberg | G06Q 40/06 705/36 R |
| 6,484,152 B1 * | 11/2002 | Robinson | G06Q 10/0635 705/36 R |
| 6,839,686 B1 | 1/2005 | Galant | |
| 6,876,981 B1 * | 4/2005 | Berckmans | G06Q 40/00 705/1.1 |
| 7,383,219 B1 | 6/2008 | Jennings | |
| 7,472,084 B2 | 12/2008 | Damschroder | |
| 7,689,501 B1 | 3/2010 | Gastineau et al. | |
| 7,756,769 B2 | 7/2010 | Haig | |
| 7,870,051 B1 | 1/2011 | En et al. | |
| 8,086,514 B2 | 12/2011 | Wallman | |
| 8,306,891 B1 | 11/2012 | Findlay et al. | |
| 8,370,243 B1 | 2/2013 | Cernyar | |
| 8,494,940 B1 | 7/2013 | Phillips et al. | |
| 8,577,775 B1 | 11/2013 | Gerber | |
| 8,629,872 B1 | 1/2014 | Phoa | |
| 8,635,141 B2 | 1/2014 | Zosin et al. | |
| 8,666,877 B2 | 3/2014 | Kumar et al. | |
| 8,732,059 B2 * | 5/2014 | Fiala | G06Q 40/06 705/30 |
| 9,792,565 B2 * | 10/2017 | Vogel | G06Q 30/02 |
| 2001/0025266 A1 | 9/2001 | Gastineau et al. | |
| 2002/0046145 A1 | 4/2002 | Ittai | |
| 2002/0095362 A1 | 7/2002 | Masand et al. | |
| 2002/0147671 A1 | 10/2002 | Sloan et al. | |
| 2003/0088492 A1 | 5/2003 | Damschroder | |
| 2003/0130923 A1 | 7/2003 | Charnley | |
| 2004/0049448 A1 | 3/2004 | Glickman | |
| 2005/0108134 A1 | 5/2005 | Harlow et al. | |
| 2005/0149424 A1 | 7/2005 | Weinberger | |
| 2006/0212376 A1 | 9/2006 | Snyder et al. | |
| 2007/0112662 A1 | 5/2007 | Kumar | |
| 2007/0299785 A1 | 9/2007 | Tullberg | |
| 2008/0040250 A1 | 2/2008 | Salter | |
| 2008/0071702 A1 | 3/2008 | Howard et al. | |
| 2008/0243716 A1 | 10/2008 | Oiumet et al. | |
| 2009/0048958 A1 | 2/2009 | Gardner et al. | |
| 2009/0292648 A1 | 11/2009 | Damschroder et al. | |
| 2009/0327155 A1 | 12/2009 | Dial et al. | |
| 2010/0217725 A1 | 8/2010 | Clyne et al. | |
| 2010/0235299 A1 | 9/2010 | Considine | |
| 2010/0325062 A1 | 12/2010 | O'Shaughnessy et al. | |
| 2010/0332410 A1 | 12/2010 | Brown et al. | |
| 2011/0184884 A1 | 7/2011 | Lyons et al. | |
| 2011/0251978 A1 * | 10/2011 | Davies | G06Q 40/00 705/36 R |
| 2011/0270780 A1 * | 11/2011 | Davies | G06Q 40/06 705/36 R |
| 2012/0078810 A1 | 3/2012 | McGrath | |
| 2012/0116994 A1 | 5/2012 | Michaud et al. | |
| 2012/0116996 A1 * | 5/2012 | Varma | G06Q 40/06 705/36 R |
| 2012/0246094 A1 | 9/2012 | Hsu et al. | |
| 2013/0024395 A1 | 1/2013 | Clark et al. | |
| 2013/0041848 A1 | 2/2013 | Stubbs et al. | |
| 2013/0066802 A1 | 3/2013 | Sheldon | |
| 2014/0258175 A1 | 9/2014 | Twombly et al. | |
| 2014/0279693 A1 | 9/2014 | Roy et al. | |
| 2014/0317019 A1 | 10/2014 | Papenbrock et al. | |
| 2015/0081592 A1 | 3/2015 | Stubbs et al. | |
| 2015/0154706 A1 | 6/2015 | Wakeman | |
| 2015/0324914 A1 * | 11/2015 | Zhan | G06Q 40/04 705/37 |
| 2015/0324919 A1 | 11/2015 | Riggs et al. | |
| 2016/0035032 A1 | 2/2016 | Twombly et al. | |
| 2016/0086278 A1 | 3/2016 | Renshaw | |
| 2016/0098796 A1 | 4/2016 | Jeet et al. | |
| 2016/0239918 A1 | 8/2016 | Lambur et al. | |
| 2016/0343079 A1 | 11/2016 | Vaidyanathan | |
| 2019/0304019 A1 | 10/2019 | Vaidyanathan | |

OTHER PUBLICATIONS

Jurczenko, E., Michel, T., Teiletche, J., "Generalized-Risk-Based Investing" Journal of Investment Strategies.*
U.S. Appl. No. 14/716,843 Final Office Action dated Nov. 27, 2019.
U.S. Appl. No. 14/716,843 Office Action dated Jun. 18, 2019.
U.S. Appl. No. 14/716,843 Final Office Action dated May 23, 2018.
U.S. Appl. No. 14/716,843 Office Action dated Sep. 20, 2017.

* cited by examiner

| % Weight | Ticker ▼ | Name | Country | Currency | Sector |
|---|---|---|---|---|---|
| 0.9120% | SBAC | SBA COMMUNICATIONS A | US | USD | Tech |
| 0.8635% | MU | MICRON TECHNOLOGY | US | USD | Tech |
| 0.8234% | FIS | FIDELITY NAT'L INFO SVCS | US | USD | Tech |
| 0.7979% | CSC | COMPUTER SCIENCES CORP | US | USD | Tech |
| 0.7654% | T | AT&T | US | USD | Tech |
| 0.7581% | CVS | CVS HEALTH | US | USD | Consumer |
| 0.7452% | SRE | SEMPRA ENERGY | US | USD | Industrial |
| 0.7388% | VZ | VERIZON COMMUNICATIONS | US | USD | Tech |
| 0.7075% | CMCSK | COMCAST A SPECIAL (NEW) | US | USD | Consumer |
| 0.6972% | KMB | KIMBERLY-CLARK CORP | US | USD | Consumer |

810 820 830 840 850 860

Showing 1 to 411 of 411 entries

SYSTEMS AND METHODS FOR CUSTOMIZING A PORTFOLIO USING VISUALIZATION AND CONTROL OF FACTOR EXPOSURE

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates to factor-based investing. More particularly, the present application is directed to systems and methods for constructing and analyzing a financial portfolio comprised of a set of assets, such as stocks, but which can include other assets as well, from a set of constituent factor portfolios.

BACKGROUND

In the field of financial investment, diversification is a technique that attempts to reduce risk by constructing a broad portfolio and allocating investments among various financial instruments, industries and other categories. The technique aims to mitigate risk by investing in different areas that would each react differently to the same event.

There are many different factors that affect investment returns. The classical Capital Asset Pricing Model (CAPM) attempts to explain returns in terms of two main drivers: systematic risk and idiosyncratic risk. Idiosyncratic risk is specific to an asset or small group of assets and has little or no correlation to market risk. It can therefore be substantially mitigated or eliminated from a portfolio by using adequate diversification. Systematic risk, under the CAPM, is the risk that arises from exposure to the market. This systematic risk is captured by market beta, which is the sensitivity of a security's return to the overall market. Because systematic risk cannot be decreased by diversification, investors are compensated with expected returns proportional to the extent in which they bear this risk. Thus, the expected return can be viewed as a function of its beta to the market.

Arbitrage Pricing Theory (APT), on the other hand, holds that the expected return of a financial asset may be modeled as a function of various macroeconomic factors or theoretical market indexes. Generally speaking, a factor can be thought of as an attribute or characteristic relating a group of securities that is important in explaining their returns and risk. Today, factors are generally categorized into three main groups: macroeconomic, statistical, and fundamental. Macroeconomic factors may include measures such as inflation, GDP, and other macroeconomic measures. Statistical factors use econometric models to estimate the risk and expected performance of assets. Fundamental factors relate to characteristics of an asset such as membership in a particular industry or global region, valuation ratios, and technical indicators.

There are many possible factors that can be used to explain investment returns and risk. However, not all factors are created equally. Empirical studies of certain particular factors have identified these factors as having exhibited excess returns above the market. Such factors may be called risk premia factors or simply risk premia.

Factor investing is an investment strategy in which assets are selected based on risk premia, or attributes that are associated with higher returns. Factor investing can thus be thought of as selecting return-generating attributes rather than selecting asset classes or individual assets such as stocks. Risk premia factor portfolios can be thus be created by selecting assets which exhibit the risk premia. Such factor portfolios can be combined in various proportions to capture the desired exposure to those risk premia.

Portfolio construction entails both selection of assets and weighting of those assets. Traditional approaches to portfolio construction in the equity universe commonly involves either low-cost capitalization-weighted index funds (i.e. passive management) or active management. One criticism of passive management is that because exposure to an individual stock is automatically increased when its price appreciates and is automatically decreased when its price falls, cap-weighted index funds over-weight stocks that have already "run up" in value and under-weight stocks that have performed relatively poorly. It can be argued whether or not this is a good effect depending on overall equity market conditions at given times, but one clear fact is that optimizing the weighting of stocks is not an explicit or even indirect objective of a cap-weighted index. At the other extreme, active management tends to be opaque, entails high management and turnover expenses, and has been shown in the aggregate to more often than not underperform market indices (net of fees) over long time horizons. So-called "smart beta" investing offers a third option for portfolio construction. The term "smart beta" may be applied to a broad array of investing strategies whose common feature is that they that use non-cap-weighted indices. Smart beta strategies may offer many of the same benefits as traditional passive investing, including broad market exposure, diversification, liquidity, transparency, and low-cost access to markets. Also, they may offer the same types of performance profile of well-performing active managers, with all the benefits heretofore described of passive management.

SUMMARY

In one embodiment, a method for constructing a blended portfolio of factor portfolios is disclosed. The method involves receiving user input for proportions of constituent factor portfolios in a blended portfolio, generating the blended portfolio as a weighted combination of the constituent factor portfolios according to the input by converting the input into relative proportions, providing a visual representation of the blended portfolio showing the proportions of the constituent factor portfolios, and providing a visual representation of a performance metric of the blended portfolio by aggregating the performance metrics for each individual asset in the blended portfolio. Each factor portfolio may be a weighted combinations of assets selected for exhibiting risk premia factors. The method may also involve providing a visual representation of a performance metric of a benchmark portfolio for comparison purposes. The method may also involve generating a trading order for the blended portfolio as a listing of each individual asset and its relative proportion in the blended portfolio. The constituent factor portfolios are generated by selecting a universe of assets, selecting factors, calculating factor scores for each asset using historical pricing or fundamental asset information, ranking the assets according to the factor scores, and generating each factor portfolio by selecting a subset of the assets using the rankings. The factors may each be one of membership in a geographic region, membership in an industry, size, quality, low volatility, momentum, value, and illiquidity. The choice of database may limit the amount of factors that can be derived, and often times, only the first four factors are utilized, but the preceding list represents the full list of factors. Selecting a subset of the assets may involve selecting assets from a top portion of the ranking by factor score, or it may involve selecting assets from a bottom portion of the ranking by factor score. Factor portfolios may be constructed in complementary pairs by selecting a subset of assets from a top portion of a ranking by factor score for a first factor portfolio and by selecting a subset of assets from a bottom portion of the ranking by factor score for a second factor portfolio. The factor portfolios may also be periodically rebalanced using updated pricing and fundamental asset information.

In one embodiment, a physical and tangible computer readable medium for storing computer readable instructions is disclosed. The computer readable instructions may perform a method for constructing a blended portfolio of factor portfolios when executed by one or more processing devices. The method involves receiving input for controlling proportions of constituent factor portfolios in a blended portfolio, generating the blended portfolio as a weighted combination of the constituent factor portfolios according to the input by converting the input into relative proportions, providing a visual representation of the blended portfolio showing the proportions of the constituent factor portfolios, and providing a visual representation of a performance metric of the blended portfolio by aggregating the performance metric for each individual asset in the blended portfolio.

In another embodiment, a method for evaluating a selected portfolio of assets across a range of regimes is disclosed. The method involves retrieving a set of historical data for a universe of assets from which a selected portfolio is constructed or historical economic data, and dividing the historical data into a number of time-based intervals. The method further involves calculating from the historical data for each interval an interval score representing a measure of a selected characteristic of the historical data, and categorizing the intervals into a number of regimes based on the interval scores. Finally, the method involves calculating for each regime a composite regime score for the selected portfolio by calculating an individual score for each asset in the portfolio for the selected characteristic during each of the time-based intervals and aggregating the individual scores across the intervals within each regime. Such regime analysis can be performed for a wide variety of selected characteristics, including but not limited to measures of market returns, market volatility, factor performance, consumer price index, industrial production, unemployment rate, interest rates, and inflation.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings:

FIG. 8 illustrates an example of a holdings listing for a blended portfolio according to an embodiment of the disclosed subject matter;

DETAILED DESCRIPTION

Reference will now be made in detail to the present examples of the invention illustrated in the accompanying drawings. Wherever possible, the same reference numbers will be used throughout the drawings to refer to the same or like elements.

Figure 1:
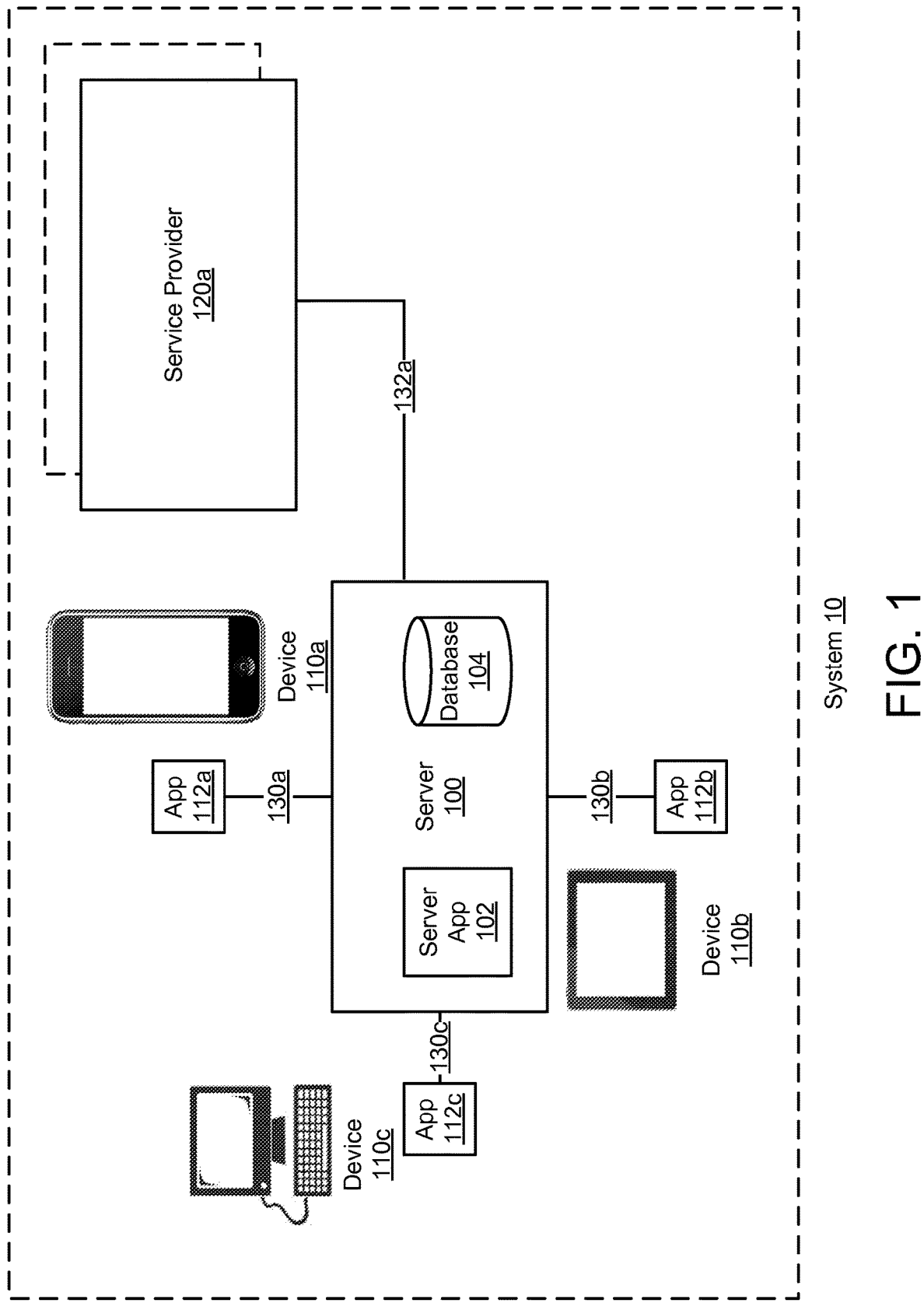
FIG. 1 illustrates an example system according to an embodiment of the disclosed subject matter.

FIG. 1 illustrates an example system according to one embodiment of the disclosed subject matter. In FIG. 1, system 10 comprises server 100 communicatively coupled to service providers 120, such as service provider 120*a* shown here, via communication links 132, such as communication link 132*a* shown here. Server also comprises server app 102 and database 104, which will be described in more detail herein. Server app 102 communicates with client apps 112, such as client apps 112*a*, 112*b*, and 112*c* shown here, via communication links 130 such as communication links 130*a*, 130*b*, and 130*c* shown here. Client apps 112 execute on various devices 110, such as devices 110a, 110b, and 110c shown here. Communications links 130 may be, for example, wired or wireless links to the Internet and may traverse public and private networks including cellular/mobile data networks, public switched telephone networks (PSTNs), WiFi networks, and the like utilizing a wide range of frequencies and protocols as are known in the art. Communication links 130 may comprise combinations of such networks over a wide range of connections including cable, fiber optic, microwave, satellite, and other radiofrequency (RF) links. Communications links 132 may also be wired or wireless links to the Internet or may also comprise private links such as through dedicated or leased lines or through a virtual private network (VPN).

Server 100 may comprise a network of interconnected computing devices. Consequently, server app 102 may comprise a front-end interface executing on one or more computing devices and communicating with a back-end interface executing on one or more computing devices. Similarly, database 104 may be distributed across multiple storage and computing devices without limiting the scope of the present invention.

A device 110 may be a smartphone such as device 110a, shown here as an Apple iPhone™ running the iOS™ operating system and sold by Apple, Inc. Device 110a may also be a smartphone running the Android™ operating system and manufactured and sold by various companies, or it may be a smartphone running any one of a number of other mobile operating systems including Microsoft Windows Phone™, Firefox OS™, and the like. Device 110 may alternatively be a tablet computing device such as device 110b shown here, and may similarly be running any one of a number of mobile operating systems. Device 110 may also be a personal computer, such as device 110c shown here as a desktop computer. Device 110c may also be a laptop computer, and it may be running any one of a number of PC operating systems including, for example, a version of Microsoft Windows™, Apple OS™, ChromeOS™, or a version of Linux. Device 110 may also be a smartwatch or other wearable computing device. In all cases, device 110 executes a client app 112 that communicates with server app 102 executing on server 100. Client app 112 may be, for example, a free-standing client application or it may be a web-app or applet executing through a web browser interface.

In one embodiment, server app 102 and its corresponding client apps 112 may comprise, for example, a financial investment portfolio construction and analysis tool that allows users to create and manage customized asset portfolios using graphical tools to select and visualize varying levels of exposure to one or more factors. Server app 102 may store static asset information in database 104. Static asset information may comprise, for example, historical fundamental data for the various assets such as price, trading volume, market capitalization, earnings, and the like. Static asset information may further comprise, for example, factor scores assigned to each asset. Database 104 may also comprise groupings of assets into factor portfolios, as well as groupings of assets based on various criteria such as asset classes, geographic regions, industry sectors, and the like. Continuing with this example, server app 102 may also gather and retrieve dynamic asset information from service providers 120. The dynamic asset information may comprise, for example, updated fundamental data for the various assets.

Figure 2:
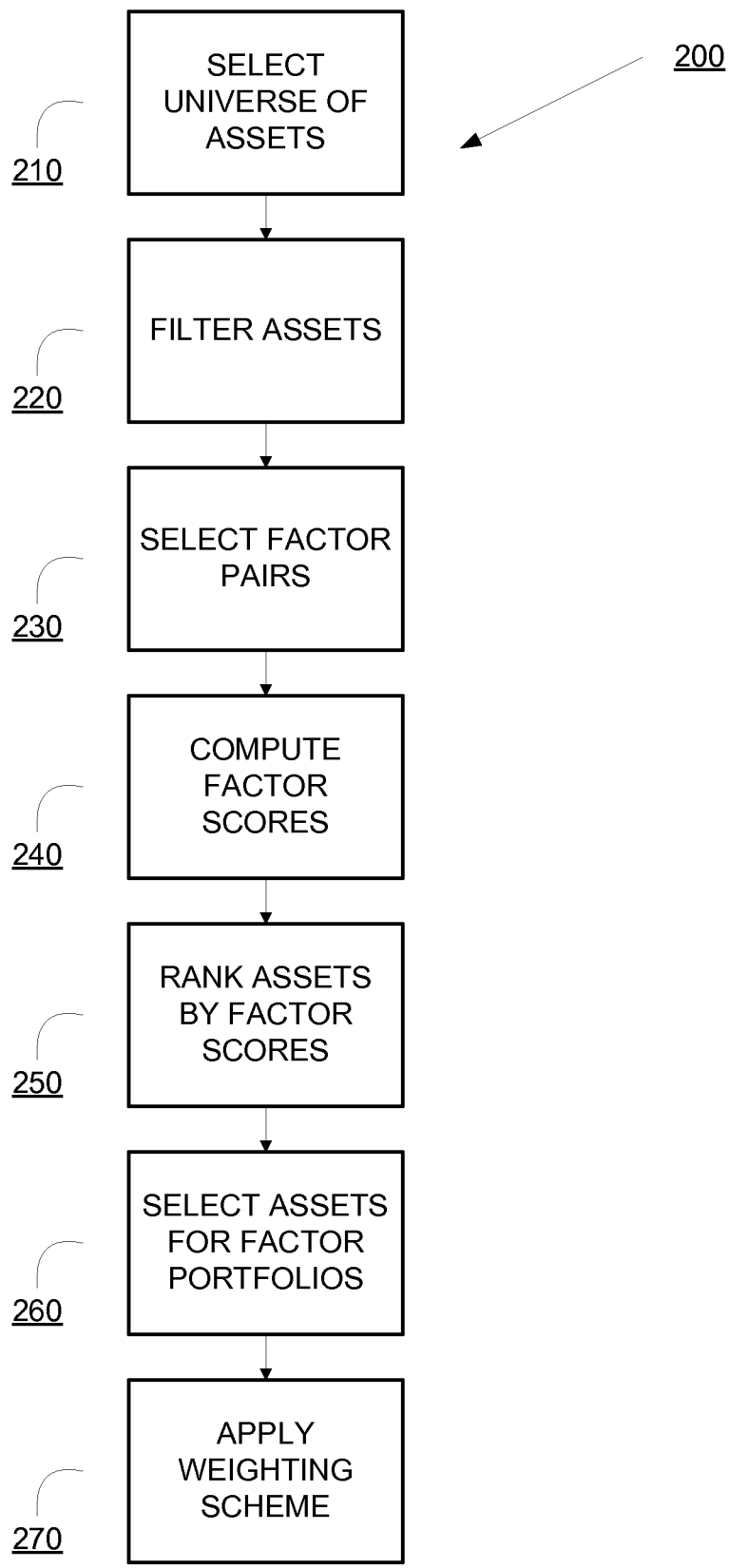
FIG. 2 is a block diagram illustrating a method for creating factor portfolios according to an embodiment of the disclosed subject matter.

FIG. 2 is a block diagram illustrating a method for creating factor portfolios according to an embodiment of the disclosed subject matter. A physical and tangible computer readable medium may store computer readable instructions, with the computer readable instructions performing the method when executed by one or more processing devices. Referring to FIG. 2 and with reference to FIG. 1, the method 200 begins at step 210 with the block labeled "SELECT UNIVERSE OF ASSETS". At this step, a portfolio construction and analysis tool selects a set of assets from which to construct factor portfolios. For example, server app 102 may select a universe of assets from database 104. The universe of assets may comprise, for example, a set of publicly traded stocks. In some embodiments, the universe of assets may be sub-divided into various groupings. For example, the universe of assets may be sub-divided based on distinct non-overlapping geographical regions called Geo Blocks. TABLE I illustrates the division scheme of the embodiment for grouping a universe of "Developed World" assets using Geo Blocks.

TABLE I

| Geo Block | Countries (ISO codes) |
| --- | --- |
| United States | US |
| Canada | CA |
| Japan | JP |
| Northern Europe | DK FI SE NO GB IE |
| Continental Europe | AT BE FR DE IT LU NL PT ES CH |

As part of the selection process, the universe of assets may be further sub-divided within each Geo Block, for example, based on distinct non-overlapping industry sectors called Broad Sectors. For example, the assets within each are grouped into five Broad Sectors including Technology, Health Care, Financial, Consumer, and Industrial.

After the universe of assets has been selected, the method 200 proceeds to step 220 with the block labeled "FILTER ASSETS". At this step, a portfolio construction and analysis tool filters the universe of assets selected at step 210. For example, server app 102 may filter the universe of assets by applying various filtering criteria to create a subset of assets to be considered for inclusion in factor portfolios. For instance, a stability filter may be applied to exclude assets that have not been in the universe under consideration continuously during the prior two year period. This filtering criterion allows the subset of assets under consideration for inclusion in factor portfolios to be limited to those assets that have a robust history of inclusion and consistent availability of clean data from the same source. At this step, other filtering criteria may also be applied to ensure that the subset of assets under consideration for inclusion in factor portfolios have the necessary liquidity and scale, while also ensuring that there is no loss of latent diversification potential in the resulting subset. As another example, assets may be filtered based on market capitalization or trading volume to further limit the number of assets. Such a filter criterion has the effect of excluding the "smallest" or "least liquid" assets in the selected universe.

Following the filtering of assets, the method 200 proceeds to step 230 with the block labeled "SELECT FACTOR PAIRS". At this step, a portfolio construction and analysis tool selects the factor pairs for which factor portfolios will be constructed. For example, server app 102 may select a set of factor pairs. In practice, an application administrator may configure and select factor pairs using a remote console (not depicted in FIG. 1) communicatively coupled to server app 102. Alternatively, the selected factor pairs may be hard-coded into server app 102. In one embodiment, factor portfolios are constructed in pairs. That is, server app 102 constructs two portfolios corresponding to each factor. In this example, these portfolios are long-only, but both long and short positions may be implemented. Each of these portfolio pairs is designed to harvest each "side" of a factor, and may be referred to as the "top" and "bottom" portfolios for each factor. To further illustrate, TABLE II below provides an example of a five-factor scheme, but only the first four factors are used in this example. Depending on the database, some subset of these factors may be utilized if not all the underlying data is available. According to TABLE II, the five factors are Value, Quality, Momentum, Low Volatility, and Illiquidity. These factors are chosen for the following reasons:

there is significant evidence in peer-reviewed academic literature supporting the idea that these factors offer a long-term risk premium that is likely to persist in the future;

these risk premia are relatively inexpensive to harvest at institutional scale through portfolio construction techniques that are well tested, intuitive to understand, and robust; and there is sufficient historic data to evaluate its performance during various "bad times" for each factor, as well as during "bad times" for the equity markets and the economy in general.

TABLE II

| Factor | "Top" Portfolio | "Bottom" Portfolio |
| --- | --- | --- |
| Value | Value | Growth |
| Quality | High Quality | Low Quality |
| Momentum | Momentum | Contrarian |
| Low Volatility | Stable | Aggressive |
| Illiquidity | Illiquid | Liquid |

Also shown in TABLE II are the corresponding "top" and "bottom" portfolios for each of these factors. For instance, the "top" and "bottom" portfolios for the Value factor may be called "Value" and "Growth." Thus, the "Value" portfolio captures one "side" of the Value factor while the "Growth" portfolio captures the opposite "side" of the Value factor. Similarly, the "top" and "bottom" portfolios for the Quality factor may be called "High Quality" and "Low Quality", while the "top" and "bottom" portfolios for the Momentum factor may be called "Momentum" and "Contrarian." For the Low Volatility factor, the "top" and "bottom" portfolios may be called "Stable" and "Aggressive." Finally, the "top" and "bottom" portfolios for the Illiquidity factor may be called "Illiquid" and "Liquid." These factor portfolios can be combined in different proportions to form an enormously rich range of blended factor portfolios.

Since each of the factor portfolios are long-only, all of them contain exposure to the market factor. It is possible to build portfolios that minimize exposure to the market factor by taking short positions in one or more of the factor portfolios or in some broad market proxy, but it is important to note that in this case each factor portfolio consists only of long positions. This leads to greater market adaption potential for portfolios for investors who for compliance or personal preference reasons prefer not to short stocks.

Referring again to FIG. 2 and with reference to FIG. 1, the method 200 proceeds to step 240 with the block labeled "COMPUTE FACTOR SCORES". At this step, a portfolio construction and analysis tool computes factor scores for each asset that survived the selection process of steps 210 and 220. For example, server app 102 may compute scores for each asset for each of the first four factors listed in TABLE II. The server app 102 may compute these factor scores, for example, according to various formulas or methods applied to static asset information retrieved from database 104. In some cases, it may not be possible to compute a particular factor score for a particular asset. In such cases, the factor score is treated as an "NA."

TABLE III below provides examples of scoring methods for computing factor scores.

TABLE III

| Factor | Scoring Method |
| --- | --- |
| Value | Average of non-NA, winsorized z-scores of the following accounting ratios: Price-to-Book and Dividend-Yield. |
| Quality | Average of non-NA, winsorized z-scores of the following accounting metrics (applied without Broad Sector controls): Profitability (cash earnings to book value) and Earnings Growth (ratio of trend to mean absolute level). |
| Momentum | Returns over the trailing t-minus-12 to t-minus-1 months (scaled by observed volatility over the same period). |
| Low Volatility | Volatility of trailing 2 years of weekly returns. |

After the factor scores are computed for each asset, the method 200 proceeds to step 250 with the block labeled "RANK ASSETS BY FACTOR SCORES". At this step, a portfolio construction and analysis tool ranks assets for each factor (each factor pair). For example, server app 102 may rank assets for each of the first four factors (i.e., Value, Quality, Momentum, and Low-Volatility) listed in TABLE II. Where the universe of assets is divided into Geo Blocks and Broad Sectors, the assets may also be ranked within each such sub-division.

After ordering the assets for each of the factors, the method 200 proceeds to step 260 with the block labeled "SELECT ASSETS FOR FACTOR PORTFOLIOS". At this step, a portfolio construction and analysis tool selects assets for inclusion in the various factor portfolios. For example, server app 102 may select assets to include in the first eight factor portfolios listed in TABLE II. For example, assets ranking in the top tercile for each factor are included in the "top" portfolio for that factor, while assets ranking in the bottom tercile for each factor are included in the "bottom" portfolio for that factor.

In some embodiments, the factor portfolios may be constructed using Geo Blocks and/or Broad Sectors for each factor. That is, factor sub-portfolios may be constructed by ranking and selecting assets within each Geo Block and then combining the sub-portfolios into the factor portfolios. Taking it a step further, the Geo Block factor sub-portfolios may themselves be constructed by a combination of Broad Sector sub-portfolios. For some factors, only Geo Block sub-portfolios may be used, or only Broad Sector blocking may be used.

After selecting the assets for each factor portfolio, the method 200 proceeds to step 270 with the block labeled "APPLY WEIGHTING SCHEME". At this step, a portfolio construction and analysis tool applies a weighting scheme to weight each asset in each factor portfolio. For example, server app 102 may apply weighting schemes to each factor portfolio. Once the individual assets of a factor portfolio have been weighted, the factor portfolio comprises a list of individual assets with corresponding weighting coefficients.

The choice of stock weighting scheme may be done on a case-by-case basis for each factor based on the characteristics of the factor. In general, the rationale that drives the weighting decision is the implicit risk in the factor portfolio. For example, for a factor portfolio that can be expected to consist of highly risky and volatile assets, applying a Minimum Volatility weighting scheme "de-risks" (i.e., limits the risk exposure of) the portfolio. For a portfolio of assets that represent a lower level of risk, the latent correlation benefit in the portfolio can be exploited, for example, by "de-correlating" (i.e., broadening the diversification) the portfolio by using a Max Decorrelation weighting. Often times, the weighting scheme applying to each factor can be adjusted based on a specific objective of the investors, but, as a reference, default choices of the four most common factors are summarized in TABLE IV below.

TABLE IV

| Factor | Portfolio | Name | Weighting |
|---|---|---|---|
| Value | Top | Value | Min Vol |
| | Bottom | Growth | Max Decorrelation |
| Quality | Top | High Quality | Max Decorrelation |
| | Bottom | Low Quality | Min Vol |
| Momentum | Top | Momentum | Max Decorrelation |
| | Bottom | Contrarian | Min Vol |
| Low Volatility | Top | Stable | Max Decorrelation |
| | Bottom | Aggressive | Min Vol |

There are different rationales for the long term persistence of the different factor premia, and there is some debate within the academic community on the reasons and the source of these factor premia. While some academics have suggested that it is evidence of market inefficiencies, others believe that it is possible to reconcile the persistence of these long-term factor premia within the framework of efficient market theory. While certain embodiments of the disclosed subject matter describe equity risk factors, the approaches are applicable to other asset classes—such as, for example, fixed income or commodities—and other investment factors such as credit spreads or term spreads.

In the context of these factor portfolios, each "top" portfolio corresponds to the portfolio that is expected to have a positive long term risk adjusted factor premium (relative to the bottom portfolio). In contrast, the "bottom" portfolio is expected to provide a lower risk adjusted return over the long term. The operating words in the preceding sentence are, of course, "over the long term". Importantly, these risk premia can demonstrate very significant time-variation. Specifically, there are several periods, each of which can persist for uncomfortably long durations, when the sign of the factor premium might be inverted, e.g. Value might underperform Growth. Therefore, it is often desirable to maintain some exposure to the "bottom" portfolios, even though they represent, in theory, lower risk adjusted returns in the long term. Another way of stating that the "bottom" portfolios can be expected to have a lower risk adjusted return than their "top" counterparts is that the "bottom" portfolios can be expected to have a higher risk relative to their expected returns in comparison to their "top" portfolio counterparts.

As a general rule therefore, it may be desirable to preserve broad diversified long-term exposure for "top" portfolios. On the other hand, for the "bottom" portfolios the disclosed embodiments can be utilized by an investor who has a reason, either due to perception of current market conditions, or to complement other portfolios, for choosing the "bottom" portfolios. In order to obtain broad diversification (i.e. "de-correlate") from the "top" portfolios, a "Max Decorrelation" weighting scheme may be used. A Max Decorrelation weighting aims to assign weights in order to exploit the latent correlation potential in a basket of assets, without relying on historical volatilities. For the "bottom" portfolios, in order to limit the risk exposure (i.e. "de-risk") in these portfolios a "Min Vol" weighting scheme may be used. A Min Vol weighting aims to reduce the volatility of the "bottom" portfolios.

As can be seen in TABLE IV, there are two important exceptions to the general rule of applying a Max Decorrelation weighting to "top" portfolios and a Min Vol weighting to "bottom" portfolios. The first important exception relates to the Value factor and its two factor portfolios Value and Growth. Using the preceding logic, it would appear that appropriate weightings might have been Max Decorrelation for the Value portfolio and Min Vol for the Growth portfolio. Although that might appear to be reasonable choice prima-facie, some literature suggests that Value portfolio might embed a variety of risks relative to Growth portfolio. Examples of this include the so-called "Value Trap" and the potential for higher levels of downside and extreme risk in Value assets. That is, the Value risk premia is most often explained by a compensation-for-risk story rather than a structural or behavioral reason for the existence of the factor premium. Therefore, with the view of being conservative, a Min Vol weighting may be employed in order to reduce the risk of the Value portfolio and a Max Decorrelation weighting for the Growth portfolio with the goal of exploiting latent diversification. The second important exception relates to the Quality factor. Consistent with the other factors (i.e, other than Value), a Max Decorrelation weighting for the High Quality portfolio and a Min Vol weighting for the Low Quality portfolio. However, as previously noted, the exception for the Quality factor relates to the fact that the Broad Sector controls are not applied to Quality portfolios. This may be necessary for several reasons. For example, there may be a smaller number of assets in the Quality portfolios due to the need for greater amounts of accounting data, or a potential distortion to the Quality effect that is more pronounced than with other factors when imposing sector constraints.

The factor portfolios can be periodically rebalanced to account for fluctuating performance of individual assets. For example, an asset that qualifies for inclusion in a "top" portfolio such as Value may exhibit performance during the following rebalancing period which would qualify it for inclusion in the corresponding "bottom" portfolio (i.e, Growth). However, in order to reduce turnover and transient classification of assets, a buffer zone scheme can be used.

TABLE V below illustrates a buffer zone scheme that may be used to classify assets during construction and rebalancing of factor portfolios.

TABLE V

| Percentile | Treatment |
|---|---|
| Top 16.7% | Immediately in "top" portfolio |
| Next 33.3% | Retained in "top" if already in "top" Not added to "top" if not already in "top" |
| Next 33.3% | Retained in "bottom" if already in |

TABLE V-continued

| Percentile | Treatment |
| --- | --- |
| | "bottom"<br>Not added to "bottom" if not already in "bottom" |
| Bottom 16.7% | Immediately in "bottom" portfolio |

As shown in TABLE V, for example, in order to determine membership in the top or bottom portfolio, a buffer zone of 50% of a tercile (i.e., 16.66%) may be used. Thus, for example, an asset that is classified in any given rebalancing date as a Value asset will remain classified as a Value asset as long as it falls within the top tercile (i.e., 33.3%) plus a buffer (of 16.7%)=50%. In other words, an asset that is classified as a value asset (because it was previously in the top tercile) will continue to be classified as a Value asset as long as it is in the top half of the Value score ranking. Similarly, a Growth asset will remain classified as a Growth asset as long as it previously was in the bottom tercile in the Value score and thereafter remains in the bottom half of the Value score. However, for an asset to be newly considered as a Value asset, it must rise to well within the interior of the top tercile of assets when ordered by their Value scores. This buffering introduces "stickiness" in the classification and reduces turnover and transient classification.

Figure 3A:
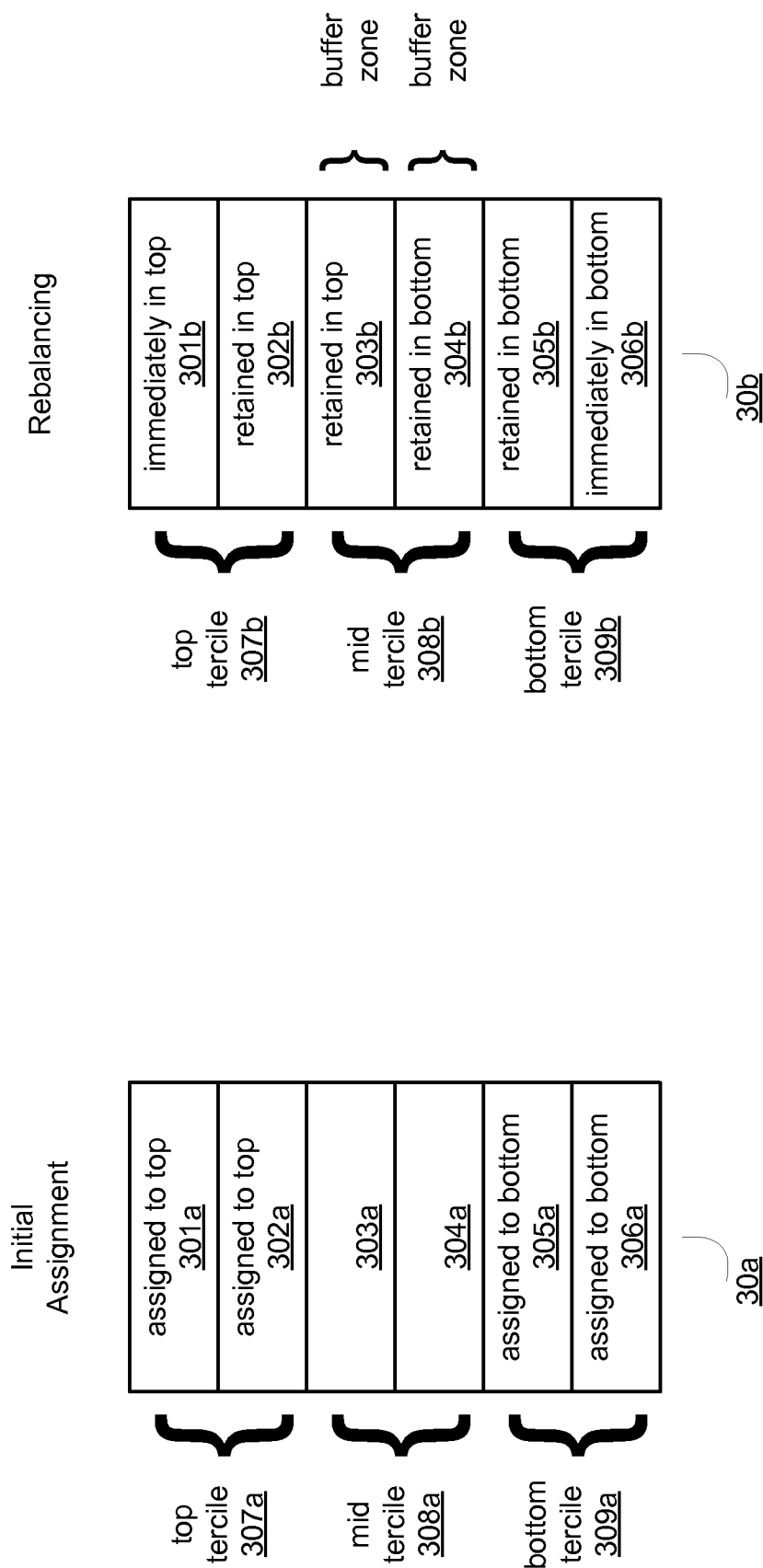
FIG. 3A illustrates the assignment of assets into top and bottom portfolios during an initial assignment and during a rebalancing according to an embodiment of the disclosed subject matter.

FIG. 3A illustrates the assignment of assets into top and bottom portfolios during an initial assignment and during a rebalancing according to an embodiment of the disclosed subject matter. In FIG. 3A, during an initial assignment of assets to "top" and "bottom" portfolios, an ordered list of assets 30a is divided into 3 terciles: top tercile 307a, mid tercile 308a, and bottom tercile 309a. Each of these terciles is further divided into two equal sections. Top tercile 307a comprises sections 301a and 302a, mid tercile 308a comprises sections 303a and 304a, and bottom tercile 309a comprises sections 305a and 306a. The sections 301a-306a thus represent equal sextiles of ordered list 30a. During an initial assignment of assets to a "top" portfolio and a "bottom" portfolio, assets in the top tercile 307a are assigned to the "top" portfolio, and assets in the bottom tercile 309a are assigned to the "bottom" portfolio. Assets in the mid tercile 308a are not assigned to either the top portfolio or the bottom portfolio.

Still referring to FIG. 3A, during a rebalancing of "top" and "bottom" portfolios, an ordered list of assets 30b is divided into 3 terciles: top tercile 307b, mid tercile 308b, and bottom tercile 309b. Each of these terciles is further divided into two equal sections. Top tercile 307b comprises sections 301b and 302b, mid tercile 308b comprises sections 303b and 304b, and bottom tercile 309b comprises sections 305b and 306b. The sections 301b-306b thus represent equal sextiles of ordered list 30b. Sections 303b and 304b, which comprise the mid tercile, are also each labeled here as a buffer zone. Section 303b is a buffer zone for the top tercile 307b and section 304b is a buffer zone for the bottom tercile 309b. Assets in section 301b are immediately assigned membership in the "top" portfolio during a rebalancing regardless of previous membership. Assets in section 302b remain in the "top" portfolio during a rebalancing if they were previously assigned membership in the "top" portfolio. Assets in section 303b, which fall into the buffer zone for the top tercile 307b, remain in the "top" portfolio during a rebalancing if they were previously assigned membership in the "top" portfolio. Similarly, assets in section 306b are immediately assigned membership in the "bottom" portfolio during a rebalancing regardless of previous membership in the "bottom" portfolio. Assets in section 305b remain in the "bottom" portfolio during a rebalancing if they were previously assigned membership in the "bottom" portfolio. Finally, assets in section 304b, which fall into the buffer zone for the bottom tercile 309b, remain in the "bottom" portfolio during a rebalancing if they were previously assigned membership in the "bottom" portfolio.

Figure 3B:
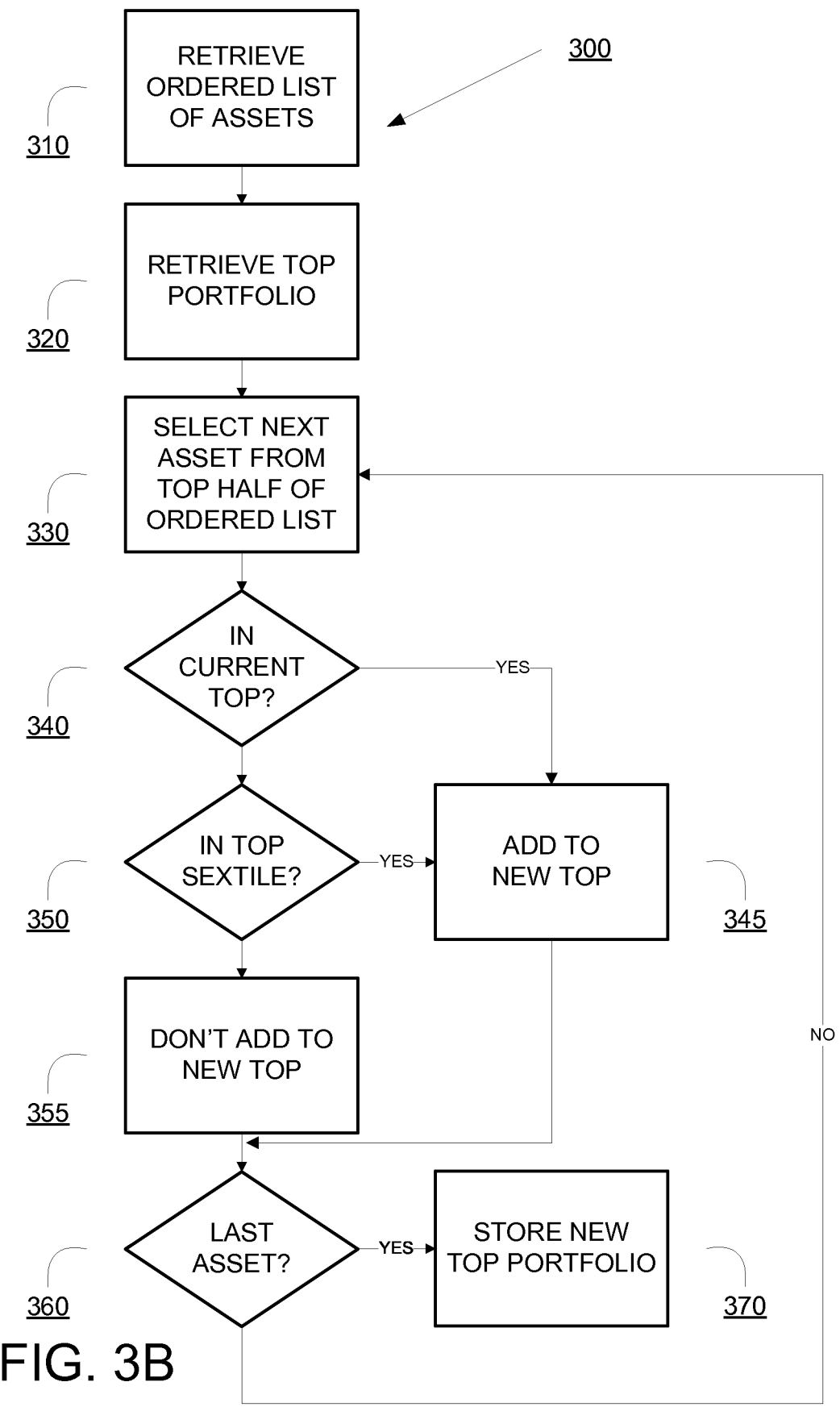
FIG. 3B is a block diagram illustrating a method for rebalancing factor portfolios using tercile buffer zones according to an embodiment of the disclosed subject matter.

FIG. 3B is a block diagram illustrating a method for rebalancing a "top" factor portfolio according to an embodiment of the disclosed subject matter. A physical and tangible computer readable medium may store computer readable instructions, with the computer readable instructions performing the method when executed by one or more processing devices. In FIG. 3B, a method 300 begins at step 310 with the block labeled "RETRIEVE ORDERED LIST OF ASSETS". At this step, a portfolio construction and analysis tool retrieves an ordered list of assets that are ranked by factor score for a given factor, such as Value. For example, server app 102 may retrieve an ordered list of assets from database 104. Alternatively, the ordered list of assets may be generated on the fly using a list of assets retrieved from database 104 or from service provider 120. The method 300 proceeds to step 320 with the block labeled "RETRIEVE TOP PORTFOLIO". At this step, a portfolio construction and analysis tool retrieves the "top" portfolios for the given factor. For example, server app 102 may retrieve the Value portfolio for the Value factor from database 104. The method 300 proceeds to step 330 with the block labeled "SELECT NEXT ASSET FROM TOP HALF OF ORDERED LIST". At this step, a portfolio construction and analysis tool selects an asset from the top half of the ordered list of assets that was retrieved at step 310. As illustrated in TABLE V, only those assets ranking in the top half for a given factor are eligible for membership in the "top" portfolio for that factor. For example, server app 102 may select an asset from the top half of the ordered list of assets for the Value factor. The method 400 proceeds to step 340 with the decision block labeled "IN CURRENT TOP?". At this step, a portfolio construction and analysis tool checks whether the selected asset is currently a member of the "top" portfolio. If so, the selected asset should remain in the "top" portfolio. For example, server app 102 may check whether the selected asset is a member of the "top" or Value portfolio for the Value factor. If the result of this inquiry is affirmative, the method 400 proceeds to step 345 with the block labeled "ADD TO NEW TOP". At this step, a portfolio construction and analysis tool adds the selected asset to a new "top" portfolio for the given factor. For example, server app 102 may add the selected asset to a new "top" or Value portfolio for the Value factor. If, on the other hand, the result of the inquiry at step 340 is negative, then the method 300 proceeds to step 350 with the decision block labeled "IN TOP SEXTILE?". At this step, a portfolio construction and analysis tool checks whether the selected asset is in the top half of the top tercile. If so, it should be included in the "top" portfolio. For example, server app 102 may check whether the selected asset is in the top half of the top tercile in the ordered list of assets retrieved at step 310. If the result of this inquiry is in the affirmative, then the method 400 proceeds to step 345. If, on the other hand, the result of this inquiry is negative, then the method 300 proceeds to step 355 with the block labeled "DO NOT ADD TO NEW TOP". At this step, the selected asset is excluded from the new "top" portfolio for the given factor. Whether the selected asset is added to the new "top" portfolio at step 345 or excluded at step 355, the method 300 proceeds to step 360 with the decision block labeled "LAST ASSET?". At this step, a portfolio construction and analysis tool checks whether the last asset has been checked or whether there are more assets to check. For example, server app 102 may check each of the assets from the top half of the ordered list retrieved at step 410. If the result of this inquiry is negative, then the method 400 proceeds to step 430. If, on the other hand, the result of this inquiry is affirmative, then the method 400 proceeds to step 470 with the block labeled "STORE NEW TOP PORTFOLIO". At this step, a portfolio construction and analysis tool stores the new "top" portfolio. For example, server app 102 may replace the "top" portfolio retrieved at step 320 with the new "top" portfolio and store it in database 104. A similar method may be used to rebalance a "bottom" factor portfolio.

Once the factor portfolios have been created, they may be advantageously combined in various combinations to create robust portfolios that capture risk premia in varying degrees of exposure. By applying different weightings of the various constituent factor portfolios, one can effectively apply different factor-based investment strategies involving one or more factors. The resultant portfolios may be called blended portfolios. For example, an investor may wish to implement an investment strategy that concentrates on the Value factor. Thus, the investor may construct a user portfolio that comprises the Value factor portfolio. Alternatively, the investor may wish to construct a user portfolio that comprises the Growth factor portfolio. As another example, the investor may wish to implement an investment strategy that focuses on two different factors, such as Quality and Low-Volatility. Thus, the investor may construct a user portfolio that comprises, for example, a combination or blend of the High Quality and Stable factor portfolios.

Figure 4B:
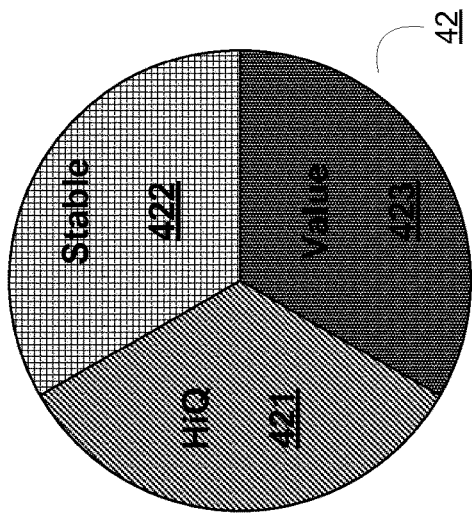
FIGS. 4A-4D are pie charts illustrating examples of blended portfolios according to embodiments of the disclosed subject matter.
Figure 4D:
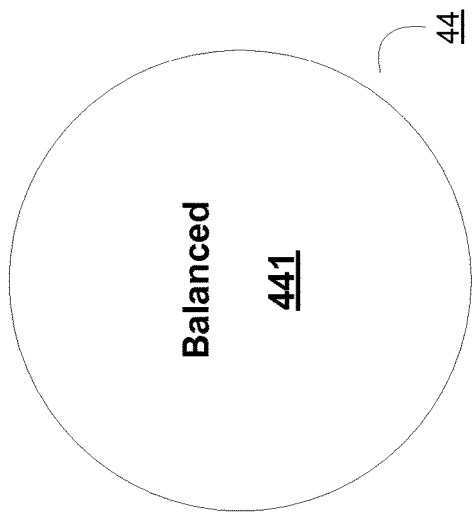
Figure 4A:
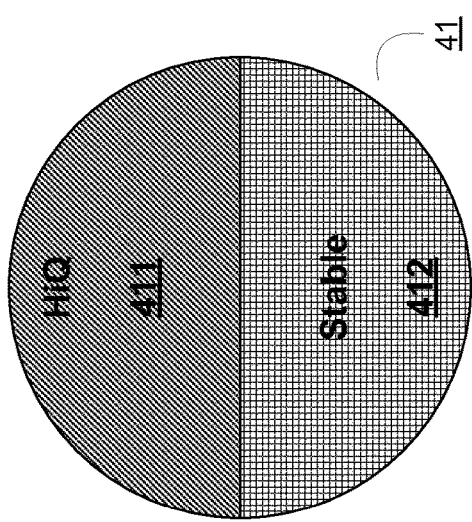

FIGS. 4A-4D are pie charts illustrating examples of blended portfolios according to embodiments of the disclosed subject matter. FIG. 4A is a pie chart illustrating an example of a blended portfolio comprising a blend of two factor portfolios according to an embodiment of the disclosed subject matter. In FIG. 4A, pie chart 41 comprises 2 sections 411 and 412. Section 411 is labeled "HiQ" and represents the High Quality factor portfolio. Section 412 is labeled "Stable" and represents the Stable factor portfolio. In FIG. 4A, sections 411 and 412 are depicted as 2 equal slices of pie chart 41, indicating an equal allocation of exposure to these two conservative risk premia portfolios. That is, the High Quality and Stable factor portfolios are weighted 50% each. In other words, the weight for each individual asset in each of the two factor portfolios is multiplied by 50%.

Figure 4C:
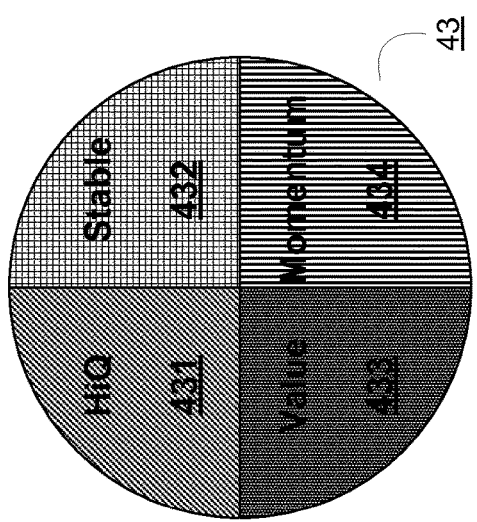

FIG. 4B is a pie chart illustrating an example of a blended portfolio comprising a blend of three factor portfolios according to an embodiment of the disclosed subject matter. In FIG. 4B, pie chart 42 comprises 3 sections 421, 422, and 423. Section 421 is labeled "HiQ" and represents the High Quality factor portfolio. Section 422 is labeled "Stable" and represents the Stable factor portfolio. Section 423 is labeled "Value" and represents the Value factor portfolio. In FIG. 4B, sections 421, 422, and 423 are depicted as 3 equal slices of pie chart 42, indicating an equal allocation of exposure to these three risk premia portfolios. That is, the High Quality, Stable, and Value factor portfolios are weighted 33.3% each. In other words, the weight for each individual asset in each of the three factor portfolios is multiplied by 33.3%. FIG. 4C is a pie chart illustrating an example of a blended portfolio comprising a blend of four factor portfolios according to an embodiment of the disclosed subject matter. In FIG. 4C, pie chart 43 comprises 4 sections 431, 432, 433, and 434. Section 431 is labeled "HiQ" and represents the High Quality factor portfolio. Section 432 is labeled "Stable" and represents the Stable factor portfolio. Section 433 is labeled "Value" and represents the Value factor portfolio. Section 434 is labeled "Momentum" and represents the Momentum factor portfolio. In FIG. 4C, sections 431, 432, 433, and 434 are depicted as 4 equal slices of pie chart 42, indicating an equal allocation of exposure to these four risk premia portfolios. That is, the High Quality, Stable, Value, and Momentum factor portfolios are weighted and periodically rebalanced at 25% each. In other words, the weight for each individual asset in each of the four factor portfolios is multiplied by 25%.

FIG. 4D is a pie chart illustrating an example of a blended portfolio comprising a blend of eight factor portfolios according to an embodiment of the disclosed subject matter. In FIG. 4D, pie chart 44 comprises 1 section 441. Section 441 is labeled "Balanced" and represents a balanced portfolio that actually comprises a combination of all of the first eight factor portfolios listed in TABLE II. That is, the Low Quality, High Quality, Aggressive, Stable, Growth, Value, Contrarian, and Momentum factor portfolios are weighted and rebalanced at 12.5% each. In other words, the weight for each individual asset in each of the eight factor portfolios is multiplied by 12.5%. This represents an "agnostic" strategy that provides equal exposure to both sides of each factor as well as to each factor. It can also be said that this blended portfolio is neutral with respect to each of the four factors.

Figure 4E:
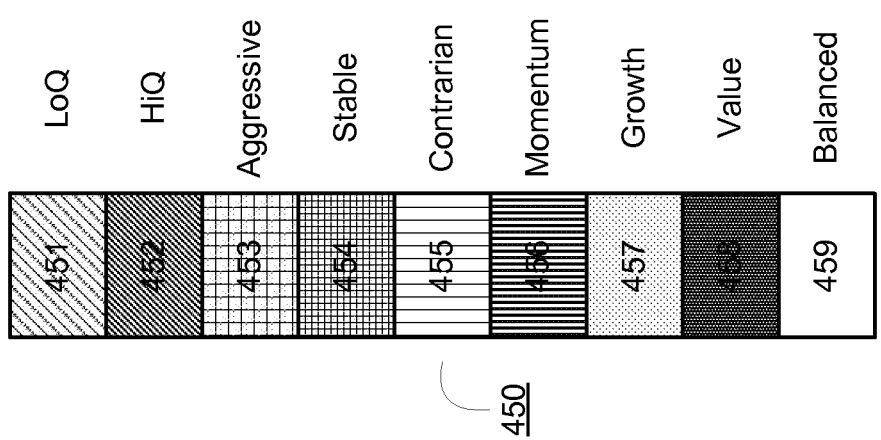
FIG. 4E illustrates a legend or key for graphical representations of blended portfolios as weighted combinations of factor portfolios, such as those illustrated in FIGS. 4A-4D, 6A-6H, and 7A-7D.

FIG. 4E illustrates a legend or key for graphical representations of blended portfolios as weighted combinations of factor portfolios, such as those illustrated in FIGS. 4A-4D, 6A-6H, and 7A-7D. In FIG. 4E, legend or key 450 comprises patterns 451-459. Pattern 451 as shown here is labeled "LoQ" and corresponds to a LoQ factor portfolio. Pattern 452 as shown here is labeled "HiQ" and corresponds to a HiQ factor portfolio. Pattern 453 as shown here is labeled "Aggressive" and corresponds to a Aggressive factor portfolio. Pattern 454 as shown here is labeled "Stable" and corresponds to a Stable factor portfolio. Pattern 455 as shown here is labeled "Contrarian" and corresponds to a Contrarian factor portfolio. Pattern 456 as shown here is labeled "Momentum" and corresponds to a Momentum factor portfolio. Pattern 457 as shown here is labeled "Growth" and corresponds to a Growth factor portfolio. Pattern 458 as shown here is labeled "Value" and corresponds to a Value factor portfolio. Finally, pattern 459 as shown here is labeled "Balanced" and corresponds to a Balanced blended portfolio comprising equal proportions of LoQ, HiQ, Aggressive, Stable, Contrarian, Momentum, Growth, and Value factor portfolios. Although the Balanced portfolio is a not a factor portfolio per se, it may be used as a building block or constituent portfolio in some blended portfolios.

Figure 5A:
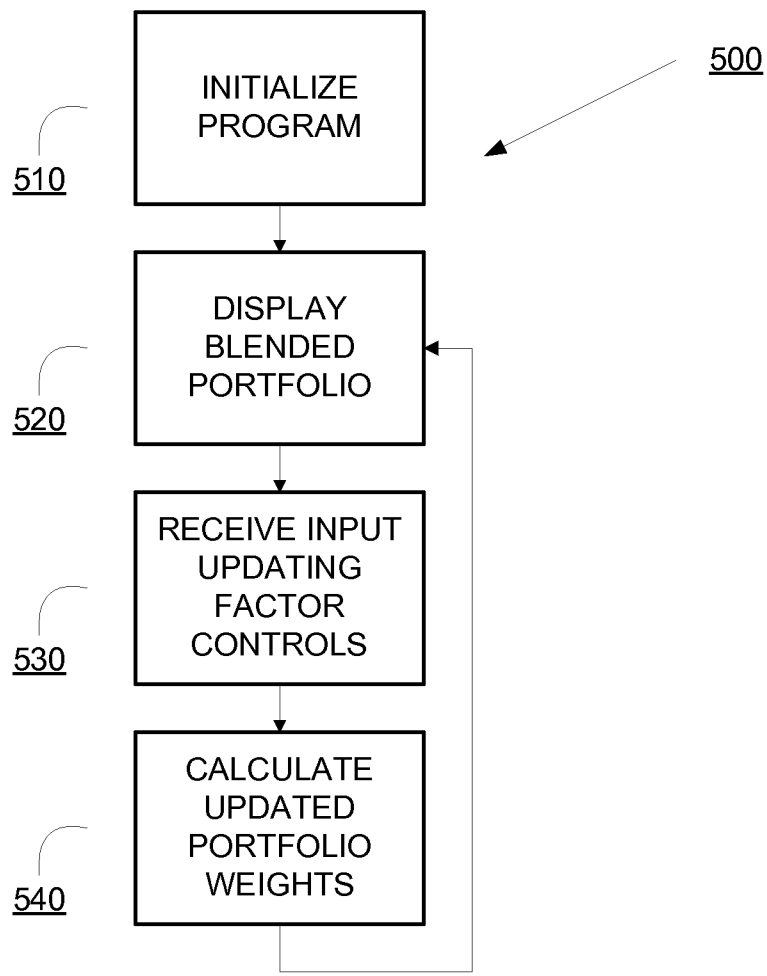
FIG. 5A is a block diagram illustrating a method for creating a blended portfolio as a combination of factor portfolios according to an embodiment of the disclosed subject matter.

FIG. 5A is a block diagram illustrating a method for creating a blended portfolio as a combination of factor portfolios according to an embodiment of the disclosed subject matter. A physical and tangible computer readable medium may store computer readable instructions, with the computer readable instructions performing the method when executed by one or more processing devices. According to FIG. 5A and with reference to FIG. 1, a method 500 begins at step 510 with the block labeled "INITIALIZE PROGRAM". At this step, a portfolio construction and analysis tool is initialized. For example, server app 102 may be initialized when a user launches an app 112 executing on a device 110.

Figure 5B:
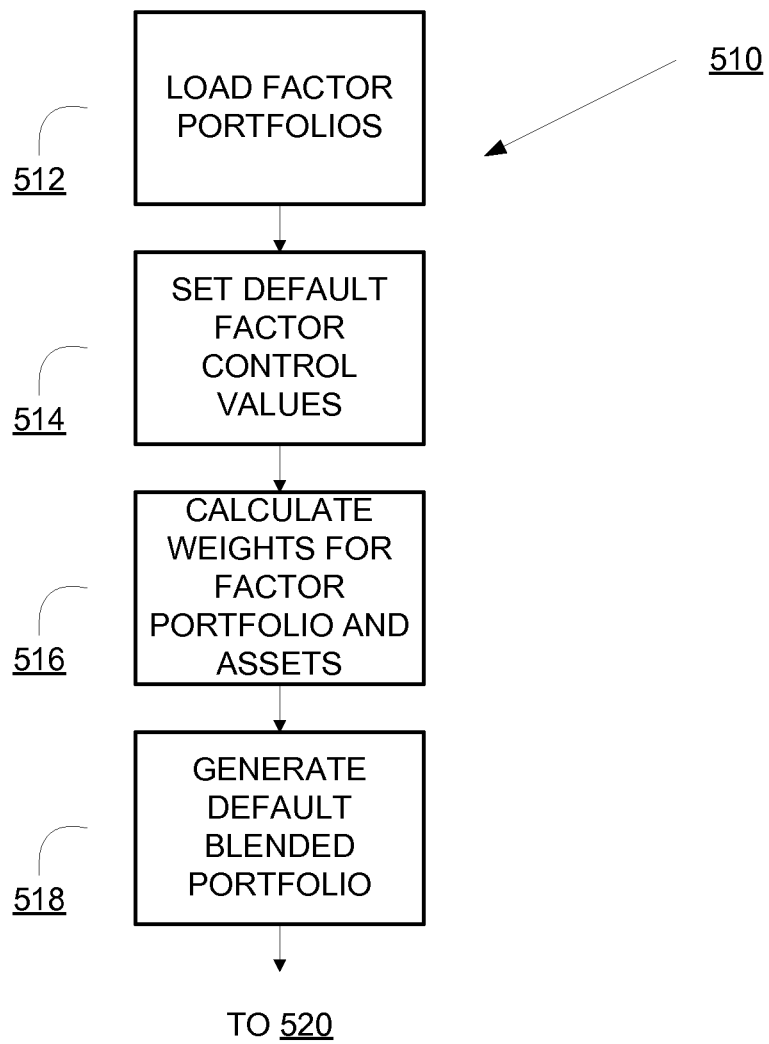
FIG. 5B is a block diagram illustrating a method for initializing a portfolio construction and analysis tool according to an embodiment of the disclosed subject matter.

FIG. 5B is a block diagram illustrating a method for initializing a portfolio construction and analysis tool according to an embodiment of the disclosed subject matter. In FIG. 5B, an example of a process corresponding to step 510 from the method 500 illustrated in FIG. 5A and described herein is shown. In FIG. 5B, the process of step 510 begins at step 512 with the block labeled "LOAD FACTOR PORTFOLIOS". At this step, a portfolio construction and analysis tool loads previously generated factor portfolios. For example, server app 102 may retrieve factor portfolios from database 104. Alternatively, server app 102 may generate factor portfolios on the fly using data retrieved from database 104 and/or service provider 120. The factor portfolios may comprise, for example, the first eight factor portfolios listed in TABLE II. The process of step 510 proceeds to step 514 with the block labeled "SET DEFAULT CONTROL VALUES". At this step, a portfolio construction and analysis tool sets default control values used to generate a blended portfolio. For example, server app 102 may set default control values. These default control values may correspond to weighting coefficients for the factor portfolios. The process of step 510 proceeds to step 516 with the block labeled "CALCULATE WEIGHTS FOR FACTOR PORTFOLIOS AND ASSETS". At this step, a portfolio construction and analysis tool calculates weighting coefficients for the factor portfolios and the individual constituent assets. For example, server app 102 may calculate the factor portfolio weights based on the default control values. Based on the factor portfolio weights, server app 102 may calculate weights for each individual constituent asset. The process of step 510 proceeds to step 518 with the block labeled "GENERATE DEFAULT BLENDED PORTFOLIO". At this step, a portfolio construction and analysis tool generates a default blended portfolio. For example, server app 102 may generate a default blended portfolio such as the blended portfolio illustrated in FIG. 4B. The default control values for this blended portfolio correspond to equal proportions of HiQ, Stable, and Value factor portfolios. Thus, the factor portfolio weights are 33.3% for each of these three factor portfolios. Each of these factor portfolios comprises a set of individual constituent assets each with its own weighting coefficient, which can be multiplied by the factor portfolio weights (i.e., 33.3%) in order to arrive at the final weighting coefficients for each individual constituent asset in the blended portfolio. Thus, the default blended portfolio comprises the set of individual constituent assets and their corresponding weighting coefficients as well as the weighting coefficients for each of the constituent factor portfolios. Alternatively, server app 102 may simply load the default blended portfolio, for example, from database 104. In other embodiments, the default blended portfolio may be an empty portfolio.

Referring again to FIG. 5A, the method 500 proceeds to step 520 with the block labeled "DISPLAY BLENDED PORTFOLIO". At this step, a portfolio construction and analysis tool displays the current blended portfolio. For example, server app 102 may send appropriate commands to a client app 112 executing on a device 110 to display the current blended portfolio. It should be understood that references to the server app 102 displaying something to a user involves the server app 102 sending the appropriate commands to a client app 112 executing on a device 110.

Figure 5C:
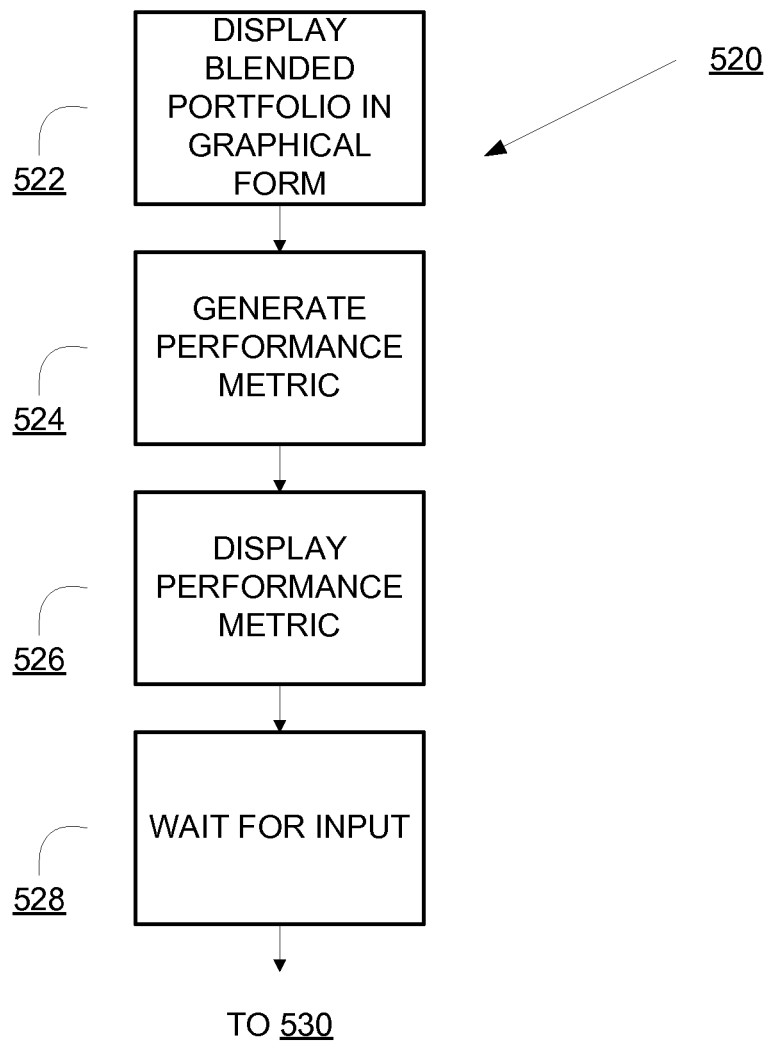
FIG. 5C is a block diagram illustrating a method for displaying a blended portfolio according to an embodiment of the disclosed subject matter.

FIG. 5C is a block diagram illustrating a method for displaying a blended portfolio according to an embodiment of the disclosed subject matter. In FIG. 5C, an example of a process corresponding to step 520 from the method 500 illustrated in FIG. 5A and described herein is shown. In FIG. 5C, the process of step 520 begins at step 522 with the block labeled "DISPLAY GRAPHICAL FORM." At this step, a portfolio construction and analysis tool displays the current blended portfolio in a graphical form. For example, server app 102 may display a pie chart or graph such as the ones illustrated in FIGS. 4A-4D. Such a pie chart may show relative proportions of the factor portfolios that comprise the current blended portfolio. Alternatively, the graphical form of the current blended portfolio may comprise a bar graph or another visual representation. The process of step 520 proceeds to step 524 with the block labeled "GENERATE PERFORMANCE METRIC". At this step, a portfolio construction and analysis tool generates a performance metric for the current blended portfolio. For example, server app 102 may generate at least one performance metric for the current blended portfolio. The performance metric may comprise, for example, a historical series or set of hypothetical returns based on the real historical performance of each individual constituent asset in the current blended portfolio. The server app 102 may calculate such a historical series or set of hypothetical returns using, for example, static asset data retrieved from database 104 and the weighting coefficients for each of the individual constituent assets in the current blended portfolio. The process of step 520 proceeds to step 526 with the block labeled "DISPLAY PERFORMANCE METRIC". At this step, a portfolio construction and analysis tool displays the performance metric for the current blended portfolio. For example, server app 102 may send appropriate commands to a client app 112 executing on a device 110 to display the performance metric for the current blended portfolio. The process of step 520 proceeds to step 528 with the block labeled "WAIT FOR INPUT". At this step, a portfolio construction and analysis tool waits for user input. For example, server app 102 may wait for user input from a user executing a client app 112 on a device 110. The user input may comprise, for example, a change to one or more control values.

Referring again to FIG. 5A, the method 500 proceeds to step 530 with the block labeled "RECEIVE INPUT UPDATING FACTOR CONTROLS". At this step, a portfolio construction and analysis tool receives input updating the factor controls. For example, server app 102 may receive input from a user executing a client app 112 on a device 110. The user may, for example, update factor controls which results in a change in the current blended portfolio by changing the control values for the factor portfolios. The factor controls may be, for example, implemented as adjustable controls within a graphical user interface. The adjustable controls may comprise, for example, adjustable sliders or dials with or without numerical labels. The adjustable controls may alternatively comprise, for example, graphical controls allowing numerical inputs that may correspond to percentages or weighting coefficients for factor portfolios. The method 500 proceeds to step 540 with the block labeled "CALCULATE UPDATED PORTFOLIO WEIGHTS". At this step, a portfolio construction and analysis tool calculates updated portfolio weights. For example, server app 102 may calculate updated portfolio weights based on the received input updating factor controls. The portfolio weights may correspond to absolute numerical amounts or may correspond to relative amounts or proportions. Continuing with the example where the default blended portfolio comprises the blended portfolio illustrated in FIG. 4B, server app 102 may receive input at step 530 updating the factor controls so that the resulting blended portfolio includes a component comprising the Momentum factor portfolio. The resulting blended portfolio may comprise, for example, the blended portfolio illustrated in FIG. 4C. The server app 102 may calculate the updated portfolio weights to be 25% for each of the four factor portfolios HiQ, Stable, Value, and Momentum. The method 500 proceeds back to step 520 and displays the newly updated blended portfolio.

An investor may use a portfolio construction and analysis tool to create a blended portfolio according to the method 500 illustrated in FIG. 5 and as described above. The investor may create the blended portfolio through a number of iterations of adjusting factor controls and observing the results on the performance of the blended portfolio. In this way, the investor can quickly and easily visualize the effects of varying degrees of factor exposure without having to deal with selecting individual assets. Once the investor is satisfied with the blended portfolio, the resulting weighted combination of individual assets can easily be converted into a trading order that may be transmitted, for example, to an electronic exchange or to a broker. Calculating the final weights for each individual asset in the blended portfolio is simply a matter of aggregating an individual asset's weight or relative proportions in each factor portfolio multiplied by the relative weight of each factor portfolio in the blended portfolio.

Figure 6A:
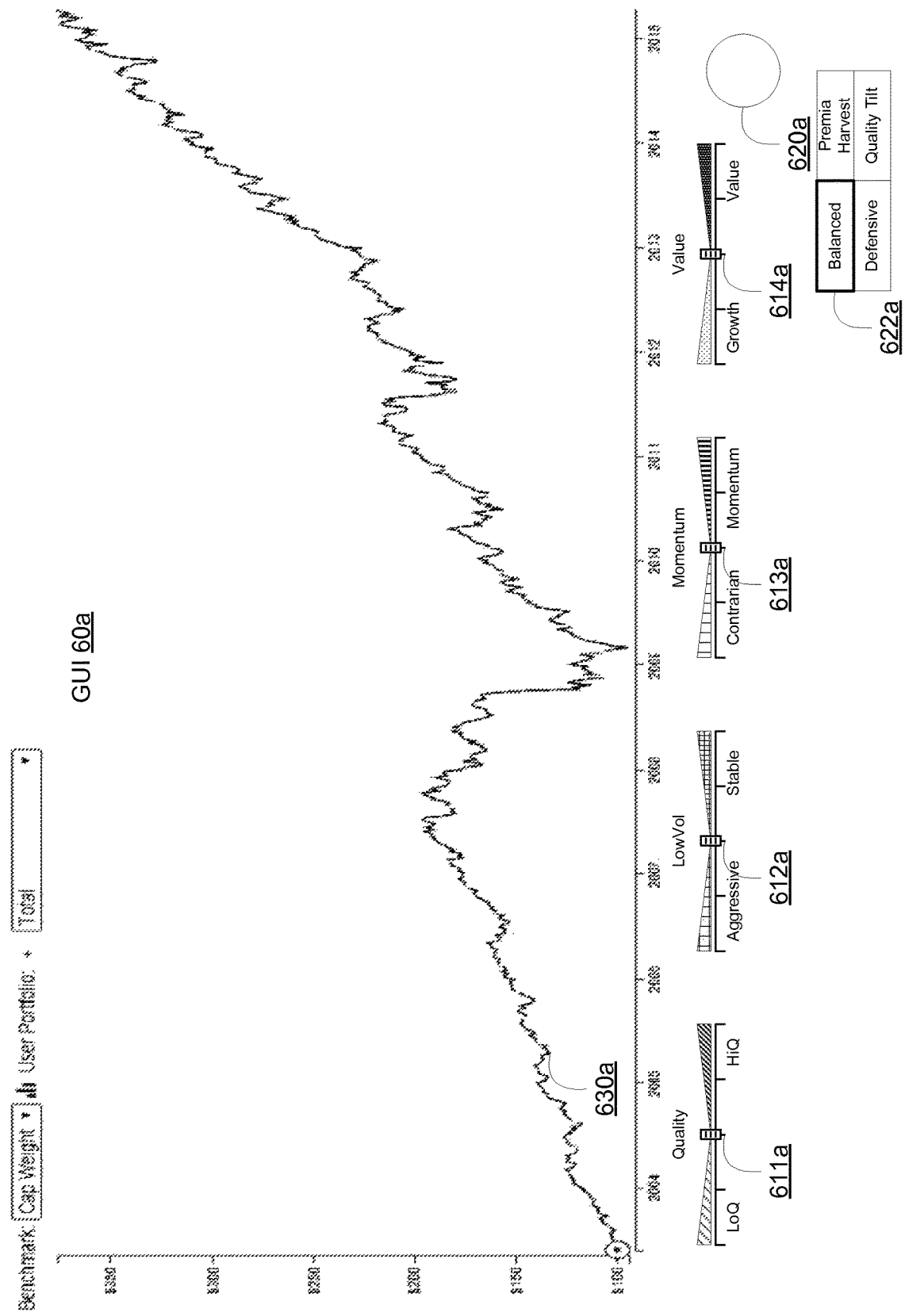
FIGS. 6A-6H illustrate an example of a graphical user interface for a portfolio construction and analysis tool along with various blended portfolios according on an embodiment of the disclosed subject matter.

FIGS. 6A-6H illustrate an example of a graphical user interface for a portfolio construction and analysis tool along with various blended portfolios according to an embodiment of the disclosed subject matter. In FIG. 6A, a GUI (graphical user interface) 60a for a portfolio construction and analysis tool comprises factor controls 611a, 612a, 613a, and 614a. The GUI 60a also comprises graphical form 620a, preset blend button 622a, and performance metric 630a. Each of these elements is further described in turn.

The factor controls allow a user to interactively adjust exposure to the factors Quality, LowVol, Momentum, and Value, respectively. As shown, factor controls 611a, 612a, 613a, and 614a are slider controls, each with 5 positions. For example, factor control 611a has five positions ranging from LoQ on the extreme left side to HiQ on the extreme right side. Similarly, factor control 612a has five positions ranging from Aggressive on the extreme left side to Stable on the extreme right side. Likewise, factor control 613a has five positions ranging from Contrarian on the extreme left side and Momentum on the extreme right side. Finally, factor control 614a has five positions ranging from Growth on the extreme left side to Value on the extreme right side. The positions on the factor controls 611a, 612a, 613a, and 614a can be converted into weighting coefficients for the factor portfolios. For example, when any of the factor controls 611a, 612a, 613a, and 614a is set in the middle position, the resulting blended portfolio may be neutral with respect to that factor. In other words, the risk premia factor is balanced. In this example, each of the factor controls 611a, 612a, 613a, and 614a is set in the middle position. The resulting blended portfolio is thus balanced with respect to each of the four risk premia or factors. Each of the factor controls also has mid-range positions between the factor neutral middle position and the extreme left and extreme right positions. These mid-range positions represent a moderate exposure to one side of a given factor.

GUI 60a further comprises graphical form 620a and preset blend button 622a. Graphical form 620a is a graphical representation of a blended portfolio that is defined by the positions of the factor controls 611a, 612a, 613a, and 614a. As shown, graphical form 620a is a pie chart. The pie chart may represent the relative contributions of the eight constituent factor portfolios to the blended portfolio. In this example, however, the graphical form 620a is shown as a pie chart comprising 100% of a "balanced" portfolio, also illustrated in FIG. 4D. The graphical form 620a could alternatively be represented as a pie chart with eight equal wedges of 12.5% for each of the eight factor portfolios. Preset blend button 622a allows a user to select this blended portfolio directly as a preset blended portfolio. Selecting the "balanced" portfolio using present blend button 622a automatically resets factor controls 611a, 612a, 613a, and 614a to their middle positions, which represent "balanced" or risk premia factor neutral positions.

GUI 60a further comprises performance metric 630a. Performance metric 630a as shown here is a graphical representation of a measurement of performance of the blended portfolio that is defined by the positions of the factor controls 611a, 612a, 613a, and 614a and that is represented by graphical form 620a. Performance metric 630a as shown here is a line graph depicting a weighted index of the returns of the assets in the blended portfolio. Alternatively, performance metric 630a may be presented in a tabular format or other suitable representation of a measurement of the performance of the blended portfolio. Advantageously, performance metric 630a may be compared to a well-known performance metric or benchmark, including a market cap-weighted index such as the S&P 500 or other well-known index. The benchmark may alternatively be any other portfolio whose performance may be measured and quantified to provide a comparison. An investor utilizing a portfolio construction and analysis tool can thus easily visually compare the performance of a blended portfolio with a well-known benchmark or other customized benchmark.

Figure 6B:
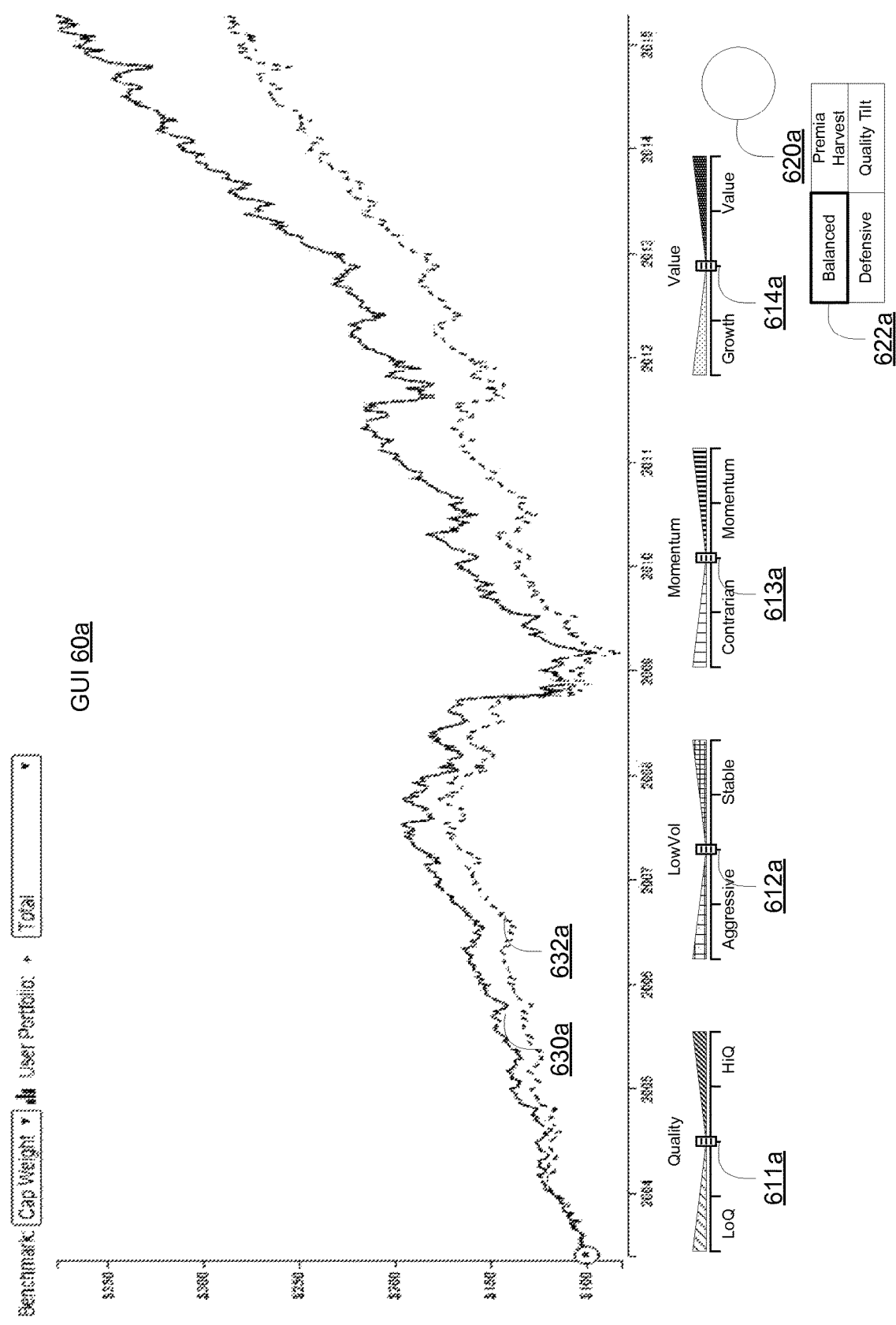

FIG. 6B illustrates an example of a graphical user interface for a portfolio construction and analysis tool according on an embodiment of the disclosed subject matter. FIG. 6B is identical to FIG. 6A except for the addition of performance benchmark 632a. Performance benchmark 632a as shown here is a graphical representation of a market-cap weighted index. Performance benchmark 632a may take on other forms. For example, performance benchmark 632a may be a graphical representation of the performance of an individual factor portfolio.

Figure 6C:
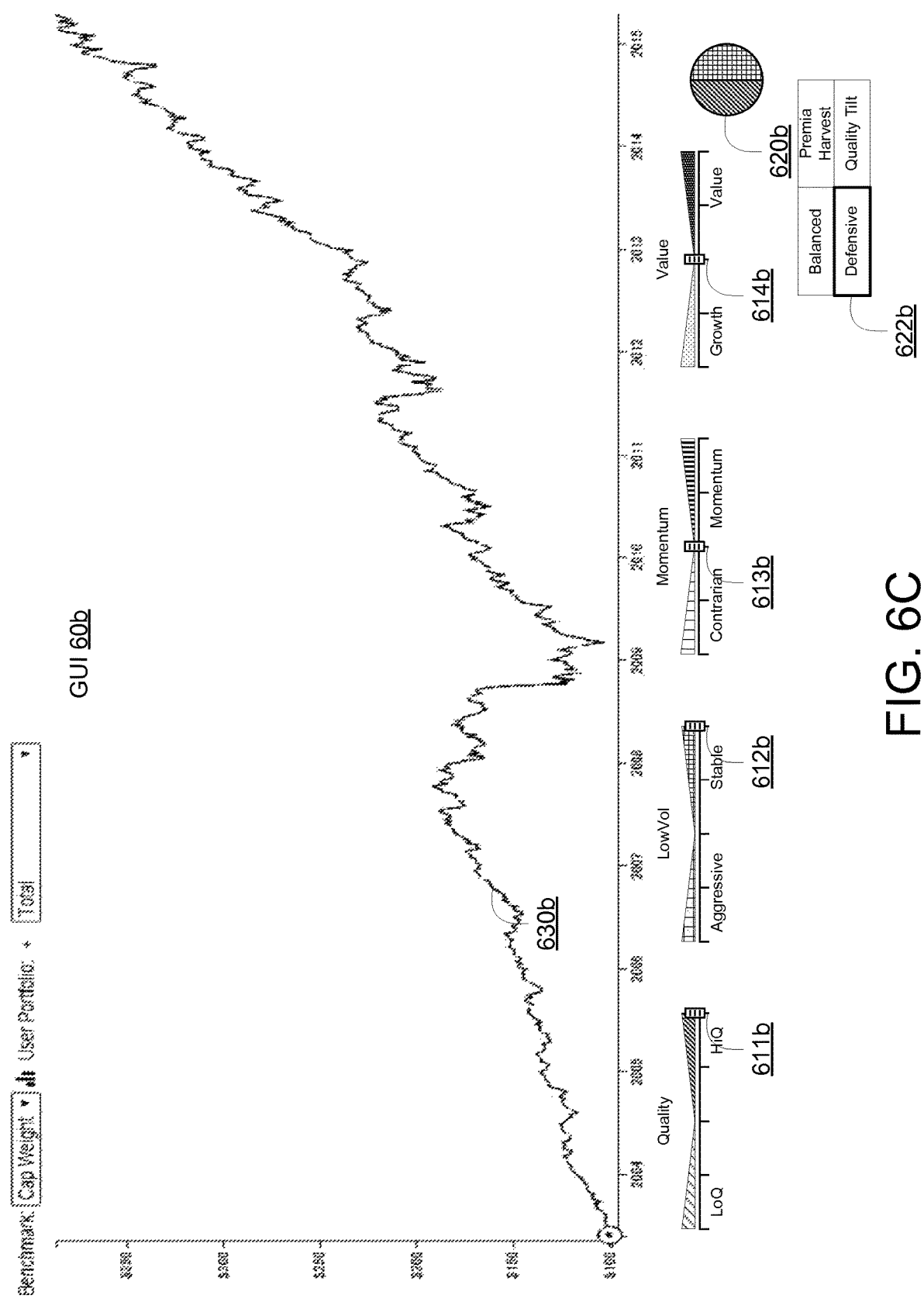
Figure 6D:
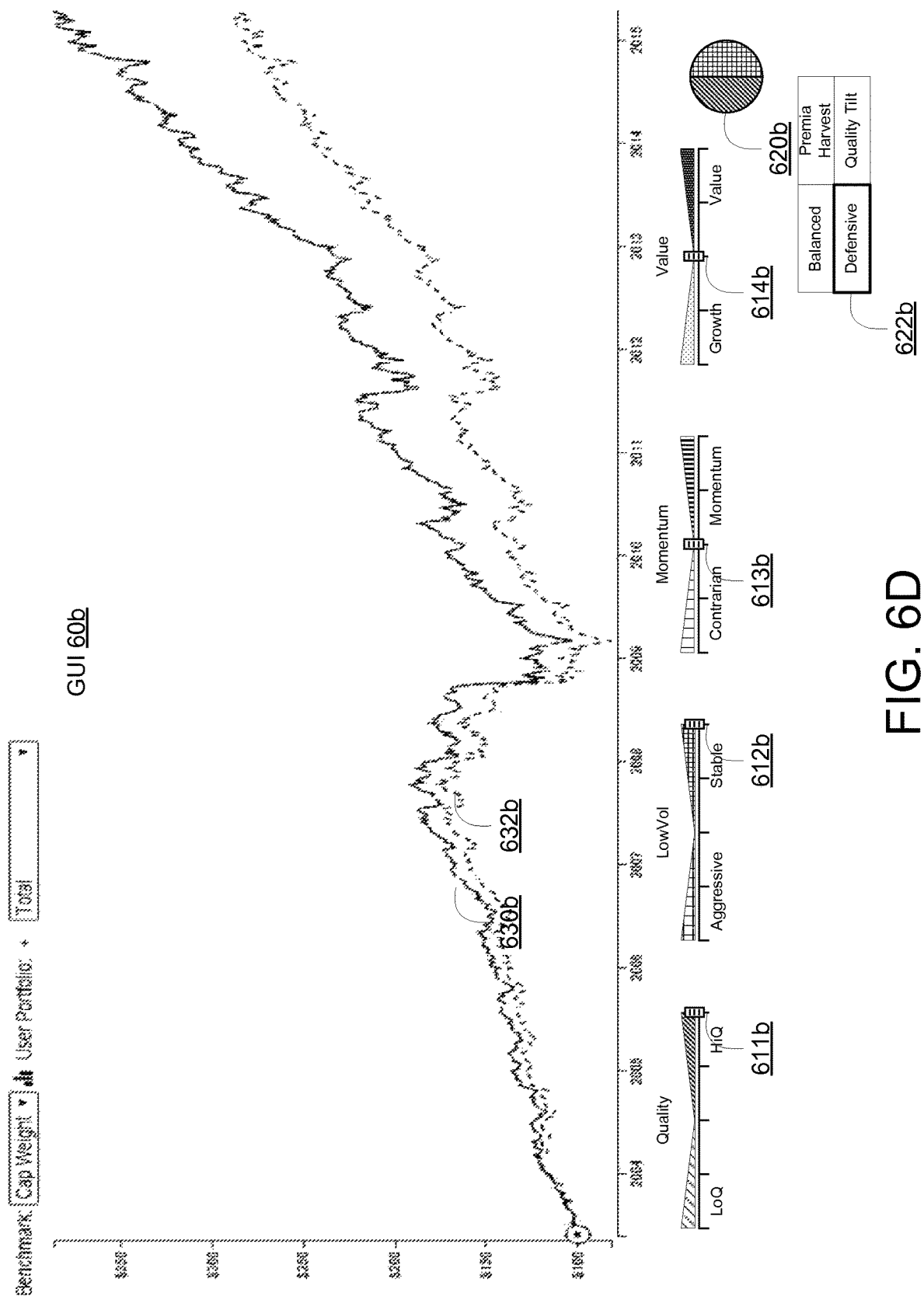

FIGS. 6C and 6D illustrate an example of a graphical user interface for a portfolio construction and analysis tool along with an example of a blended portfolio according to an embodiment of the disclosed subject matter. In FIGS. 6C and 6D, a GUI 60b comprises factor controls 611b, 612b, 612c, and 613d. GUI 60b also comprises graphical form 620b, preset blend button 622b, performance metric 630b, and performance benchmark 632b. The factor controls 611b, 612b, 613b, and 614b define a blended portfolio by their positions, which represent relative contributions of constituent factor portfolios. The resultant blended portfolio is represented graphically by graphical form 620b, and a graphical measurement of performance of the blended portfolio is represented by performance metric 630b. The performance of the blended portfolio may be compared against performance benchmark 632b. In this example, factor controls 611b, 612b are set to maximum amounts at their extreme right positions, while factor controls 613b and 614b are set to factor neutral amounts in their middle positions. The resultant blended portfolio, represented by graphical form 620b, comprises equal proportions of the HiQ and Stable factor portfolios. This blended portfolio, also illustrated in FIG. 4A, is neutral with respect to the Value and Momentum risk premia factors, and can be selected directly by using preset blend button 622b.

Figure 6E:
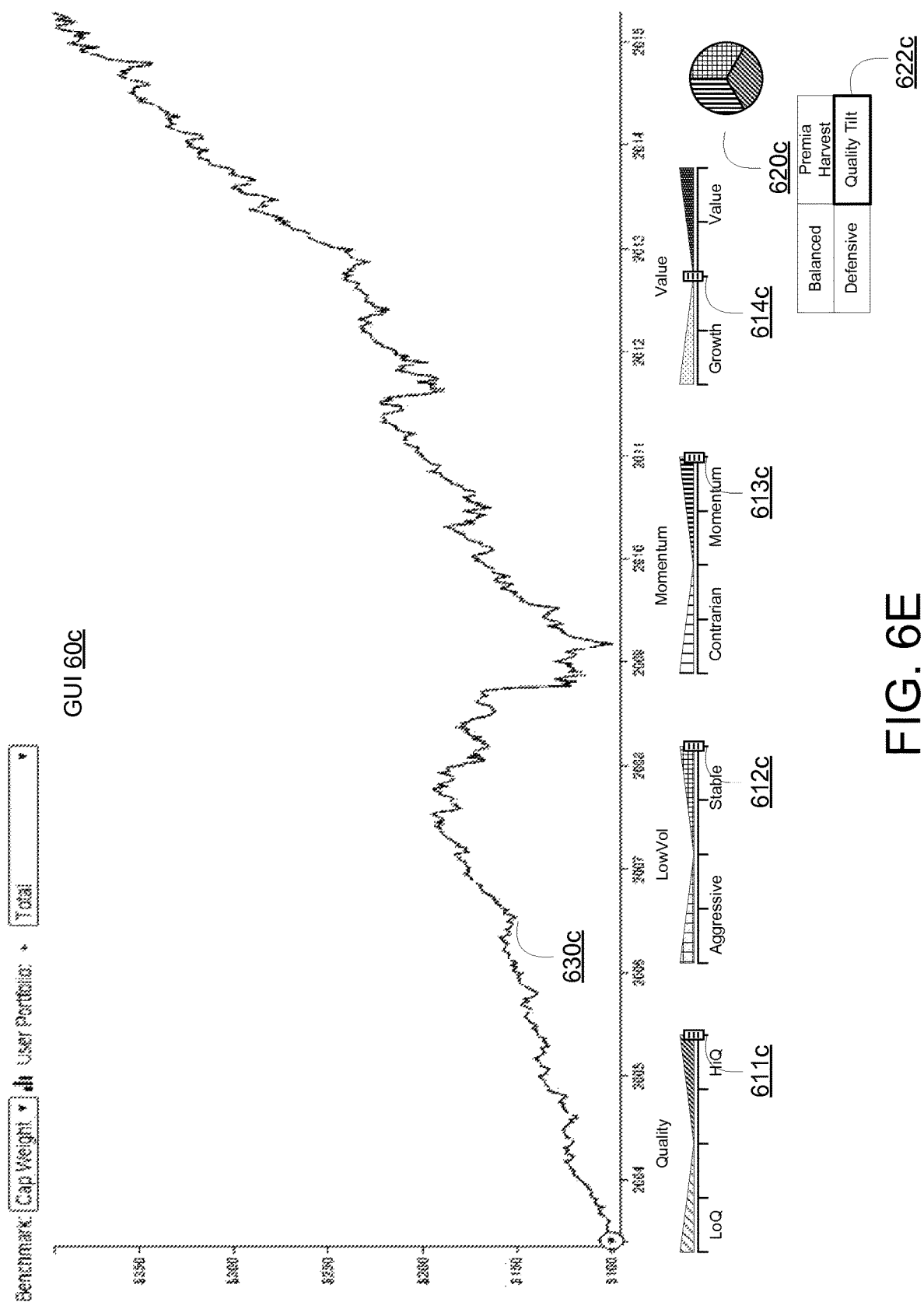
Figure 6F:
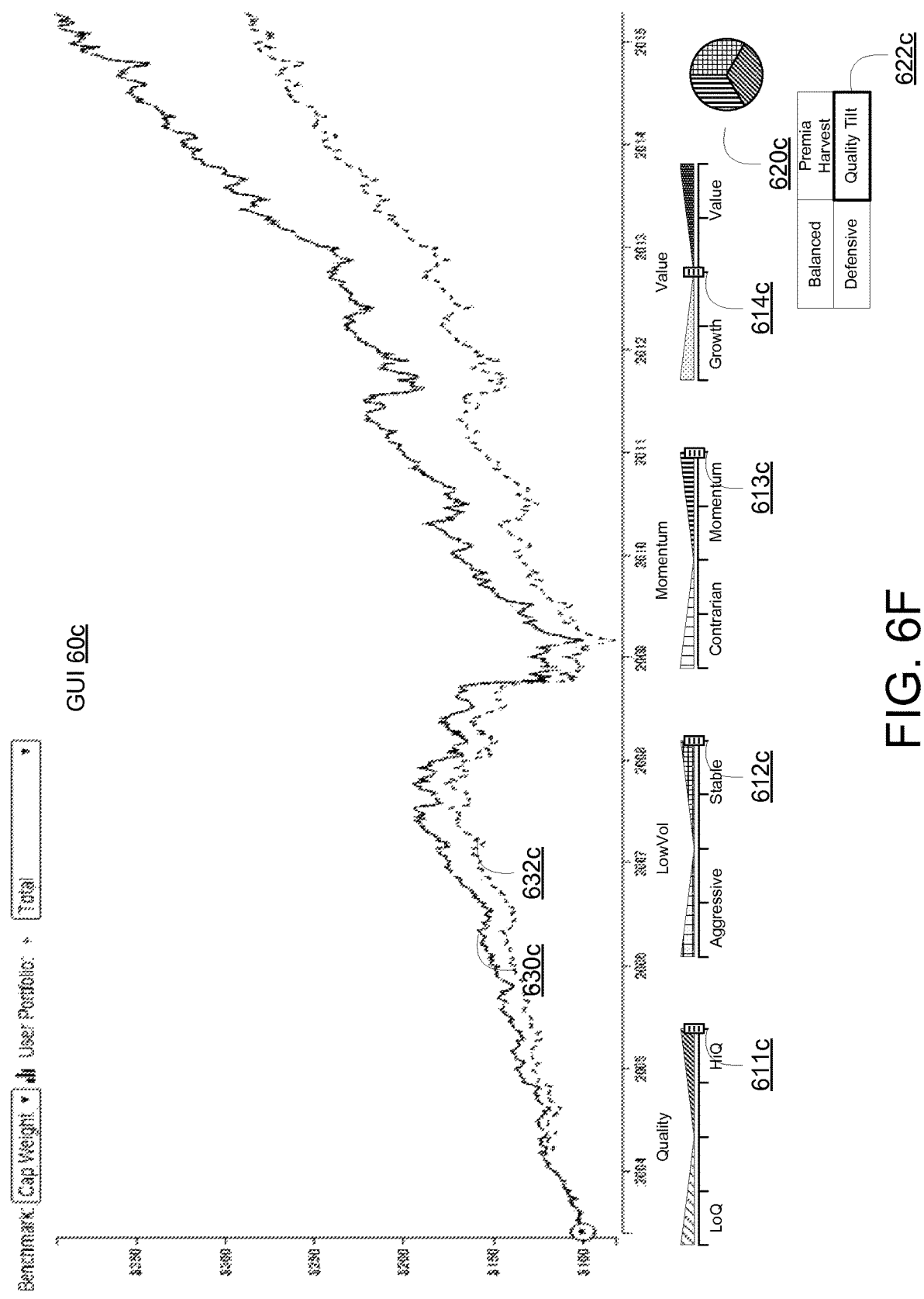

FIGS. 6E and 6F illustrate an example of a graphical user interface for a portfolio construction and analysis tool along with an example of a blended portfolio according to an embodiment of the disclosed subject matter. In FIGS. 6E and 6F, a GUI 60c comprises factor controls 611c, 612c, 613c, and 614c. GUI 60c also comprises graphical form 620c, preset blend button 622c, performance metric 630c, and performance benchmark 632c. The factor controls 611c, 612c, 613c, and 614c define a blended portfolio by their positions, which represent relative contributions of constituent factor portfolios. The resultant blended portfolio is represented graphically by graphical form 620c and a graphical measurement of performance of the blended portfolio is represented by performance metric 630c. The performance of the blended portfolio may be compared against performance benchmark 632c. In this example, factor controls 611c, 612c, and 613c are set to maximum amounts at their extreme right positions, while factor controls 614c is set to a factor neutral amounts in their middle positions. The resultant blended portfolio, represented by graphical form 620c, comprises equal proportions of the HiQ, Stable, and Value factor portfolios. This blended portfolio, also illustrated in FIG. 4B, does not maintain any explicit exposure to the Momentum risk premia factor, and can be selected directly by using preset blend button 622c.

Figure 6G:
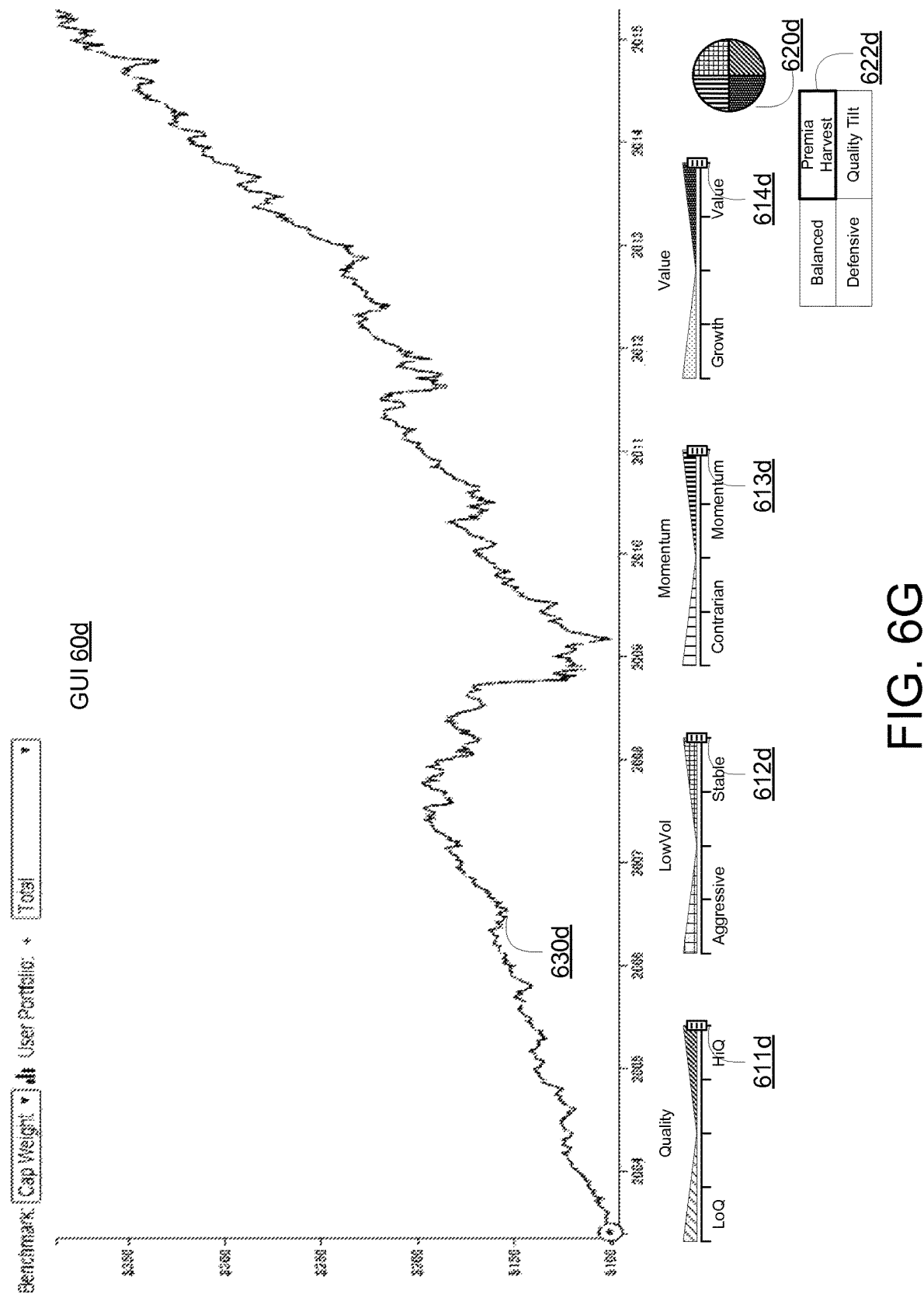
Figure 6H:
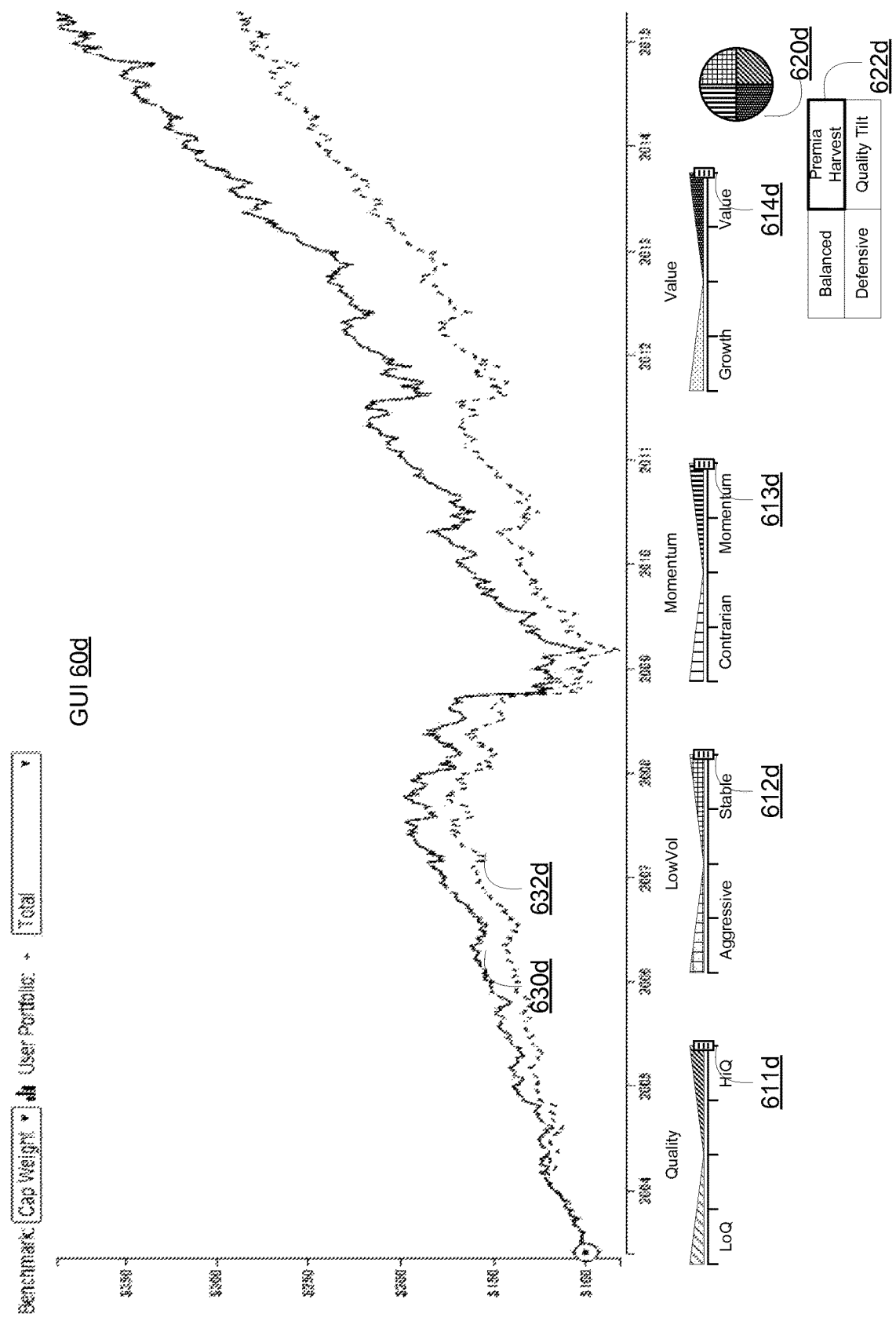

FIGS. 6G and 6H illustrate an example of a graphical user interface for a portfolio construction and analysis tool along with an example of a blended portfolio according to an embodiment of the disclosed subject matter. In FIGS. 6G and 6H, a GUI 60d comprises factor controls 611d, 612d, 613d, and 614d. GUI 60c also comprises graphical form 620d, preset blend button 622d, performance metric 630c, and performance benchmark 632d. The factor controls 611d, 612d, 613d, and 614d define a blended portfolio by their positions, which represent relative contributions of constituent factor portfolios. The resultant blended portfolio is represented graphically by graphical form 620d and a graphical measurement of performance of the blended portfolio is represented by performance metric 630d. The performance of the blended portfolio may be compared against performance benchmark 632d. In this example, factor controls 611d, 612d, 613d, and 614d are set to maximum amounts at their extreme right positions. The resultant blended portfolio, represented by graphical form 620d, comprises equal proportions of the HiQ, Stable, Value, and Momentum factor portfolios. This blended portfolio, also illustrated in FIG. 4C, is neutral with respect to none of the risk premia factors listed in TABLE II, and can be selected directly by using preset blend button 622d.

As shown in FIGS. 6A-6H, the positions of the factor controls 611, 612, 613, and 614 do not individually specify absolute values for the proportions of factor portfolios in a blended portfolio. In FIG. 6C, for example, factor controls 611b and 612b are set to the extreme right positions, which corresponds to a blended portfolio comprising HiQ and Stable factor portfolios in equal 50% proportions. In FIG. 6E, factor controls 611c and 612c are likewise set to the extreme right positions, but because factor control 613c is also set to the extreme right position, the resulting blended portfolio comprises HiQ and Stable factor portfolios in equal 33.3% proportions (along with a 33.3% proportion of a Value factor portfolio). Thus, in some embodiments it is the combination of the positions of all of the factor controls that determines the final proportions of the factor portfolios in a blended portfolio. Alternatively, the positions of the factor controls may determine individually absolute proportions of factor portfolios in a blended portfolio. Accordingly, it may be necessary to convert any input from factor controls to relative proportions of factor portfolios. TABLE VI below provides an example of a scheme for converting positions of factor controls to relative proportions of factor portfolios in a blended portfolio.

TABLE VI

| # of non-neutral factors | proportion for each factor set to mid-range position | proportion for each factor set to extreme position | proportion for Balanced portfolio |
|---|---|---|---|
| 0 | 0% | 0% | 100% |
| 1 | 50% | 100% | remainder |
| 2 | 25% | 50% | remainder |
| 3 | 16.6% | 33.3% | remainder |
| 4 | 12.5% | 25% | remainder |

As TABLE VI illustrates, the relative proportion of a given factor portfolio in a blended portfolio depends not only on the position of the corresponding factor control, but also on the number of other non-neutral factors. Any remainder left after weighting the factor portfolios is allocated to a Balanced portfolio in this example.

Figure 7A:
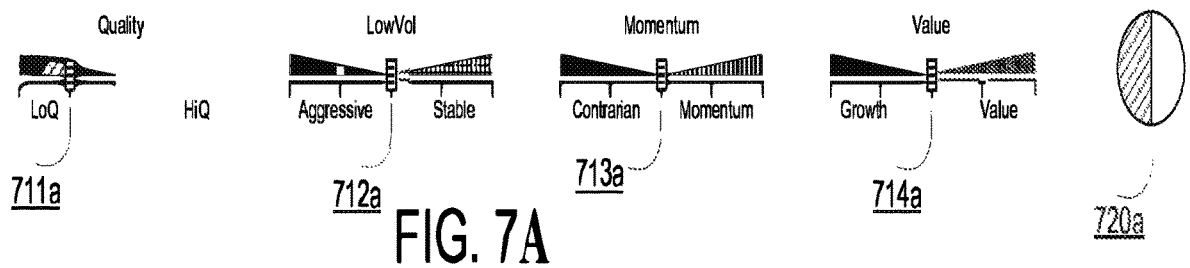
FIGS. 7A-7D illustrate examples of factor control positions and resulting blended portfolios in a portion of a graphical user interface of a portfolio construction and analysis tool according to an embodiment of the disclosed subject matter.

FIGS. 7A-7D illustrate examples of factor control positions and resulting blended portfolios in a portion of a graphical user interface of a portfolio construction and analysis tool according to an embodiment of the disclosed subject matter. In FIG. 7A, a portion of a graphical user interface for a portfolio construction and analysis tool comprises factor controls 711a, 712a, 713a, 714a and graphical form 720a. Factor control 711a controls exposure to the Quality factor through LoQ and HiQ factor portfolios. Factor control 712a controls exposure to the LowVol factor through Aggressive and Stable factor portfolios. Factor control 713a controls exposure to the Momentum factor through Contrarian and Momentum factor portfolios. Factor control 714a controls exposure to the Value factor through Growth and Value factor portfolios. Graphical form 720a is a pie chart showing the relative proportions of the constituent factor portfolios comprising the blended portfolio defined by the positions of the factor controls 711a, 712a, 713a, and 714a. As shown, factor control 711a is set to a mid-range position on the LoQ side. Factor controls 712a, 713a, and 714a are set to factor neutral middle positions. There is thus 1 non-neutral factor. In accordance with the conversion scheme of TABLE VI, this corresponds to a 50% proportion of a LoQ factor portfolio. The remainder of 50% is allocated to a Balanced portfolio, which is actually a blended portfolio of equal proportions of the eight factor portfolios LoQ, HiQ, Aggressive, Stable, Contrarian, Momentum, Growth, and Value. This allocation is reflected in graphical form 720a, which shows a pie chart of a blended portfolio with 3 slices representing 50% LoQ and 50% Balanced portfolios.

Figure 7B:
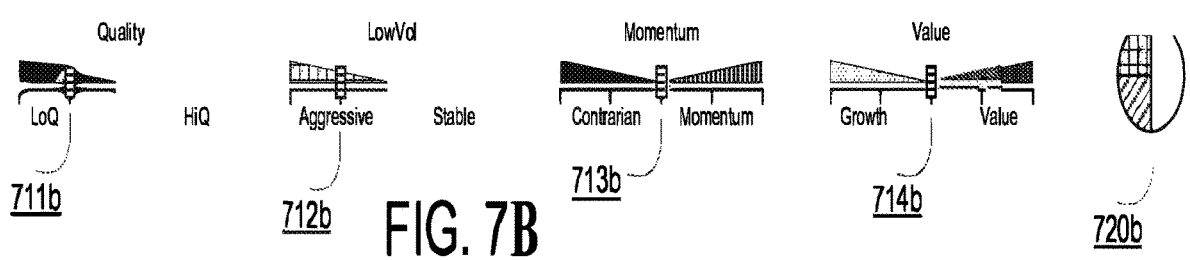

In FIG. 7B, a portion of a graphical user interface for a portfolio construction and analysis tool comprises factor controls 711b, 712b, 713b, 71ba and graphical form 720b. Factor control 711b controls exposure to the Quality factor through LoQ and HiQ factor portfolios. Factor control 712b controls exposure to the LowVol factor through Aggressive and Stable factor portfolios. Factor control 713b controls exposure to the Momentum factor through Contrarian and Momentum factor portfolios. Factor control 714b controls exposure to the Value factor through Growth and Value factor portfolios. Graphical form 720b is a pie chart showing the relative proportions of the constituent factor portfolios comprising the blended portfolio defined by the positions of the factor controls 711b, 712b, 713b, and 714b. As shown, factor control 711*b* is set to a mid-range position on the LoQ side and factor control 712*b* is set to a mid-range position on the Aggressive side. Factor controls 713*b* and 714*b* are set to factor neutral middle positions. There are thus two non-neutral factors. In accordance with the conversion scheme of TABLE VI, this corresponds to a 25% proportion of a LoQ factor portfolio and a 25% proportion of a Aggressive factor portfolio. The remainder of 50% is allocated to a Balanced portfolio. This allocation is reflected in graphical form 720*b*, which shows a pie chart of a blended portfolio with 3 slices representing 25% LoQ, 25% Aggressive, and 50% Balanced.

Figure 7C:
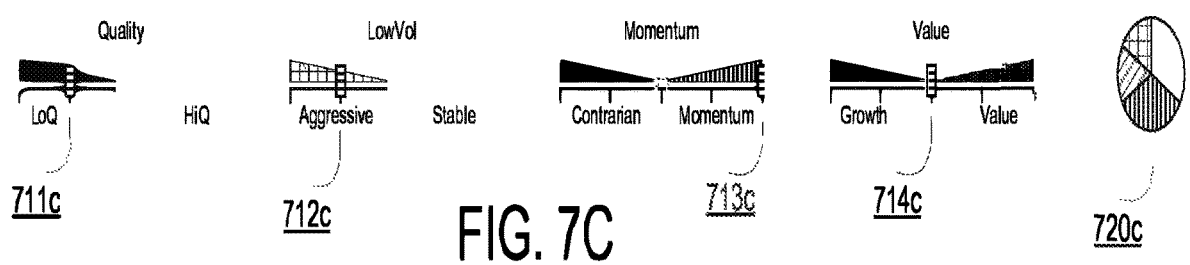

In FIG. 7C, a portion of a graphical user interface for a portfolio construction and analysis tool comprises factor controls 711*c*, 712*c*, 713*c*, 714*c* and graphical form 720*c*. Factor control 711*c* controls exposure to the Quality factor through LoQ and HiQ factor portfolios. Factor control 712*c* controls exposure to the LowVol factor through Aggressive and Stable factor portfolios. Factor control 713*c* controls exposure to the Momentum factor through Contrarian and Momentum factor portfolios. Factor control 714*c* controls exposure to the Value factor through Growth and Value factor portfolios. Graphical form 720*c* is a pie chart showing the relative proportions of the constituent factor portfolios comprising the blended portfolio defined by the positions of the factor controls 711*c*, 712*c*, 713*c*, and 714*c*. As shown, factor control 711*c* is set to a mid-range position on the LoQ side, factor control 712*c* is set to a mid-range position on the Aggressive side, and factor control 713*c* is set to an extreme position on the Momentum side. There are thus 3 non-neutral factors. In accordance with the conversion scheme of TABLE VI, this corresponds to a 16.6% proportion of a LoQ factor portfolio, a 16.6% proportion of a Aggressive factor portfolio, and a 33.3% proportion of a Momentum factor portfolio. The remainder of 33.3% is allocated to a Balanced portfolio. This allocation is reflected in graphical form 720*c*, which shows a pie chart of a blended portfolio with 4 slices representing 16.6% LoQ, 16.6% Aggressive, 33.3% Momentum, and 33.3% Balanced.

Figure 7D:
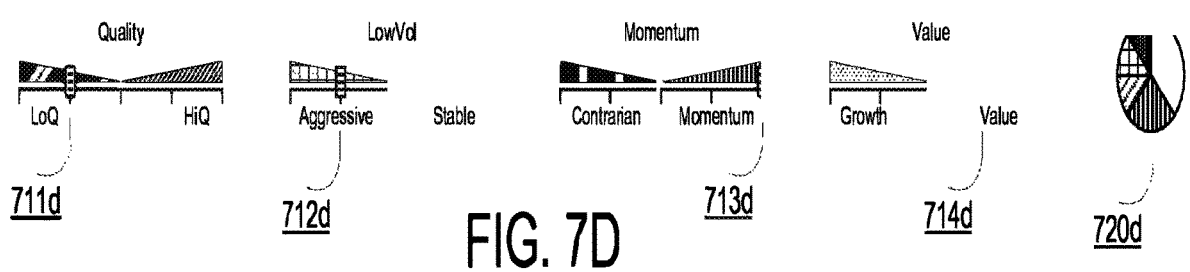

In FIG. 7D, a portion of a graphical user interface for a portfolio construction and analysis tool comprises factor controls 711*d*, 712*d*, 713*d*, 714*d*, and graphical form 720*d*. Factor control 711*d* controls exposure to the Quality factor through LoQ and HiQ factor portfolios. Factor control 712*d* controls exposure to the LowVol factor through Aggressive and Stable factor portfolios. Factor control 713*d* controls exposure to the Momentum factor through Contrarian and Momentum factor portfolios. Factor control 714*d* controls exposure to the Value factor through Growth and Value factor portfolios. Graphical form 720*d* is a pie chart showing the relative proportions of the constituent factor portfolios comprising the blended portfolio defined by the positions of the factor controls 711*d*, 712*d*, 713*d*, and 714*d*. As shown, factor control 711*d* is set to a mid-range position on the LoQ side, factor control 712*d* is set to a mid-range position on the Aggressive side, factor control 713*d* is set to an extreme position on the Momentum side, and factor control 714*d* is set to a mid-range position on the Value side. There are thus 4 non-neutral factors. In accordance with the conversion scheme of TABLE VI, this corresponds to a 12.5% proportion of a LoQ factor portfolio, a 12.5% proportion of a Aggressive factor portfolio, a 25% proportion of a Momentum factor portfolio, and a 12.5% proportion of a Value factor portfolio. The remainder of 37.5% is allocated to a Balanced portfolio. This allocation is reflected in graphical form 720*d*, which shows a pie chart of a blended portfolio with 5 slices representing 12.5% LoQ, 12.5% Aggressive, 25% Momentum, 12.5% Value, and 37.5% Balanced.

FIG. 8 illustrates an example of a holdings listing for a blended portfolio according to an embodiment of the disclosed subject matter. In FIG. 8, a portion of a holdings listing 80 is illustrated. The holdings listing is a listing of individual assets in a blended portfolio along with their individual weights or relative proportions in the blended portfolio. As shown, holdings listing 80 is a table comprising columns 810, 820, 830, 840, 850, and 860. Column 810 lists individual weights or relative proportions as percentages. Column 820 lists stock ticker symbols. Column 830 lists company names associated with the stock ticker symbols. Column 840 lists the country for the assets in holdings listing 80, and column 850 lists the currency for the assets. Finally, column 860 lists an industry sector for the assets. The holdings listing 80 can be displayed in the graphical user interface illustrated in FIGS. 6A-6H, and can easily be converted or exported to an appropriate file formatted to be used as a trading order.

As was previously described, a portfolio construction and analysis tool according to the disclosed subject matter can be used to construct a blended portfolio that is a weighted combination of factor portfolios. The same portfolio construction and analysis tool can also provide a visual representation of one or more performance metrics of the blended portfolio as well as of performance metrics of benchmark portfolios. In some cases it may also be desirable to visualize various performance metrics of the individual factor portfolios themselves. Other portfolio statistics and characteristics may also be analyzed and visualized for the individual factor portfolios, blended portfolios, and benchmark portfolios. Such other portfolio analytics may be used as diagnostic tools for evaluating the factor portfolios individually and as parts of blended portfolios. Thus they may be used as a basis for adjusting proportions of the factor portfolios in blended portfolios.

In some embodiments, a portfolio construction and analysis tool may be used to analyze and visualize various characteristics of individual factor portfolios and blended portfolios across a range of scenarios or regimes. For example, an investor may wish to understand a given portfolio's sensitivity to changes in market conditions, such as when the market is operating in a "bull" regime or a "bear" regime. As another example, an investor may wish to understand a given portfolio's sensitivity to varying levels of performance of particular factors. In choosing proportions of factor portfolios when constructing a blended portfolio, an investor may inherently choose one "side" each of particular factors and may wish to evaluate the blended portfolio in different scenarios where chosen factors either "win" or "lose." Additionally, an investor may wish to explore the sensitivity of a given portfolio to changes in macroeconomic conditions such as changes in the unemployment rate or changes in the consumer price index (CPI).

Figure 9:
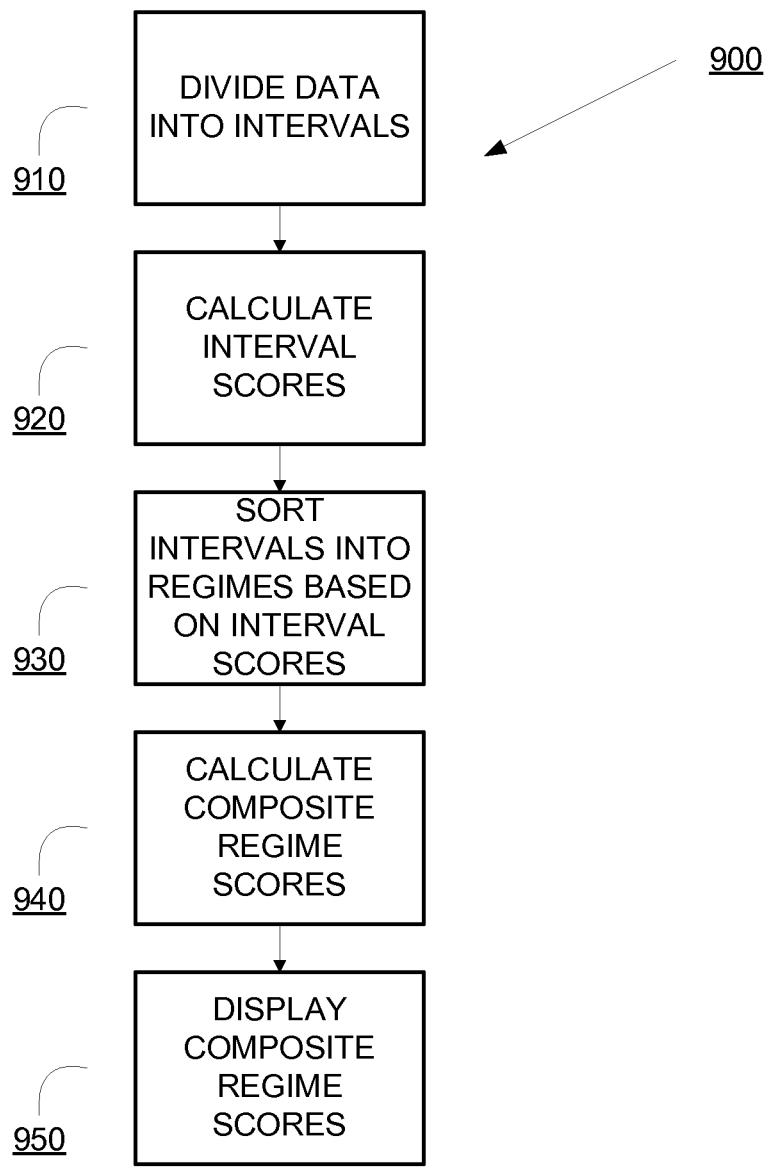
FIG. 9 is a block diagram illustrating a method for evaluating a portfolio under various regimes according to an embodiment of the disclosed subject matter.

FIG. 9 is a block diagram illustrating a method for evaluating a portfolio under various regimes according to an embodiment of the disclosed subject matter. In FIG. 9, a method 900 begins at step 910 with the block labeled "DIVIDE DATA INTO INTERVALS". At this step, a portfolio construction and analysis tool divides a set of data representing a selected characteristic of interest into a number of intervals. For example, server app 102 may divide a set of data representing market returns into quarterly intervals. This data may be based on, for example, a well-known market index or another benchmark portfolio and may be retrieved from database 104 or from a service provider 120.

The length of each interval is purely a choice of implementation and may be set by input from a user, set by an application administrator, or hard-coded in server app 102.

After dividing the data into intervals, the method 900 proceeds to step 920 with the block labeled "CALCULATE INTERVAL SCORES". At this step, a portfolio construction and analysis tool calculates a score for each interval. For example, server app 102 may calculate an average of a market index during each interval, a net change for the market index for each interval, or other suitable measure of the characteristic of interest. The method 900 proceeds to step 930 with the block labeled "SORT INTERVALS INTO REGIMES BASED ON INTERVAL SCORES." At this step, a portfolio construction and analysis tool sorts the intervals into a number of regimes based on the interval scores. For example, server app 102 may sort quarters based on quarterly return scores into five different regimes ranging from bullish to bearish. The number of regimes is purely a choice of implementation and may be set by input from a user, set by an application administrator, or hard-coded in server app 102. The intervals may be (nearly) evenly distributed among the chosen number of regimes, or they may be distributed according to rules such as by absolute interval scores or ranges of interval scores. Such rules may be set by an application administrator or hard-coded in server app 102.

After sorting the intervals into regimes, the method 900 proceeds to step 940 with the block labeled "CALCULATE COMPOSITE REGIME SCORES". At this step, a portfolio construction and analysis tool calculates a composite score for each regime for the portfolio under evaluation. This is achieved by calculating a score for each interval in a given regime and aggregating a composite score for that regime. For example, server app 102 may calculate the hypothetical returns of a blended portfolio during periods where the market could be characterized as a bull market. Since these hypothetical returns are based on actual historical returns data, the portfolio construction and analysis tool can portray how a given portfolio actually performs across a range of different regimes or scenarios. The portfolio construction and analysis tool may also calculate the hypothetical returns of individual factor portfolios, which may be useful for comparison purposes and for providing a basis for adjusting proportions of the factor portfolios in a blended portfolio.

After calculating composite scores for each regime, the method 900 proceeds to step 950 with the block labeled "DISPLAY COMPOSITE REGIME SCORES". At this step, a portfolio construction and analysis tool displays composite regime scores for each regime for a portfolio under evaluation. For example, server app 102 may display the composite regime scores in the form of data in a bar graph, a scatter graph, in tabular form, or by some other visual representation. For comparison purposes, the composite regime scores may also be displayed against those of a benchmark portfolio.

Figure 10A:
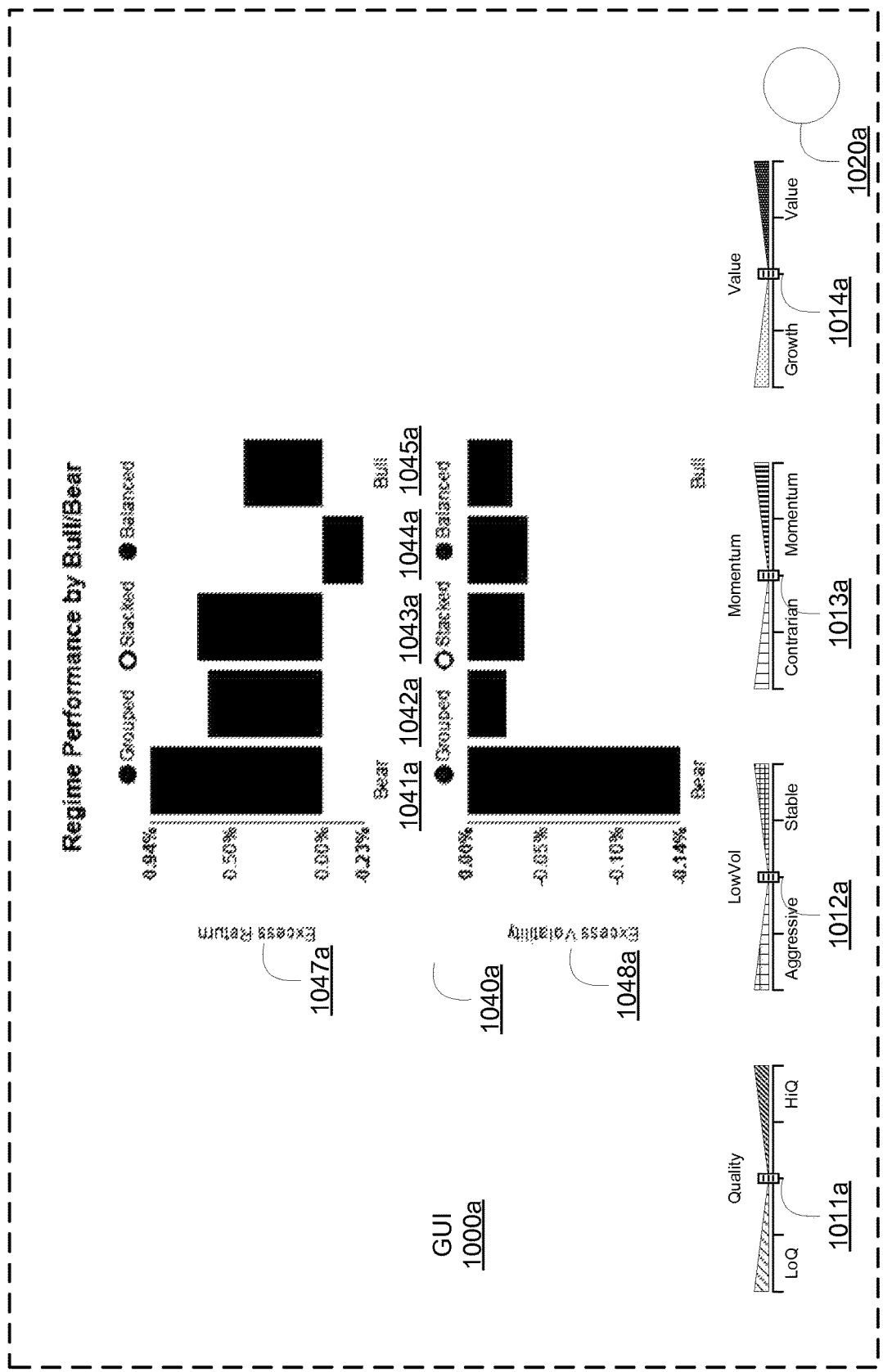
FIGS. 10A-10D illustrate examples of evaluation and visualization of selected blended portfolios across a range of regimes for a selected characteristic or market condition in a portion of a graphical user interface of a portfolio construction and analysis tool according to an embodiment of the disclosed subject matter.

FIGS. 10A-10D illustrate examples of evaluation and visualization of selected blended portfolios across a range of regimes for a selected characteristic or market condition in a portion of a graphical user interface of a portfolio construction and analysis tool according to an embodiment of the disclosed subject matter. In FIG. 10A, a preset "Balanced" blended portfolio is evaluated across a number of bull/bear market regimes. As shown in FIG. 10A, a portion of a graphical user interface (GUI) 1000a comprises graphical elements including factor controls 1011a, 1012a, 1013a, and 1014a. GUI 1000a further comprises graphical form 1020a and regime metric 1040a. Graphical form 1020a is a graphical representation of a blended portfolio that is defined by the positions of the factor controls 1011a, 1012a, 1013a, and 1014a. As shown here, graphical form 1020a is a pie chart comprising 100% of a "balanced" portfolio, which is also illustrated in FIG. 4D. The regime metric 1040a is a graphical representation of the measure of an evaluation of a selected portfolio across a number of regimes for a selected characteristic or market condition. In this case, regime metric 1040a comprises bar graphs 1047a and 1048a which illustrate excess return and excess volatility for the Balanced portfolio depicted by graphical form 1020a across regimes 1041a, 1042a, 1043a, 1044a, and 1045a. The regimes 1041a-1045a represent a range of market conditions from "bear" to "bull" as shown. In this example, excess returns and excess volatility are expressed as percentages in relation to a benchmark portfolio. Volatility can be measured, for example, as the standard deviation of daily price changes for a universe of assets in a given market.

Figure 10B:
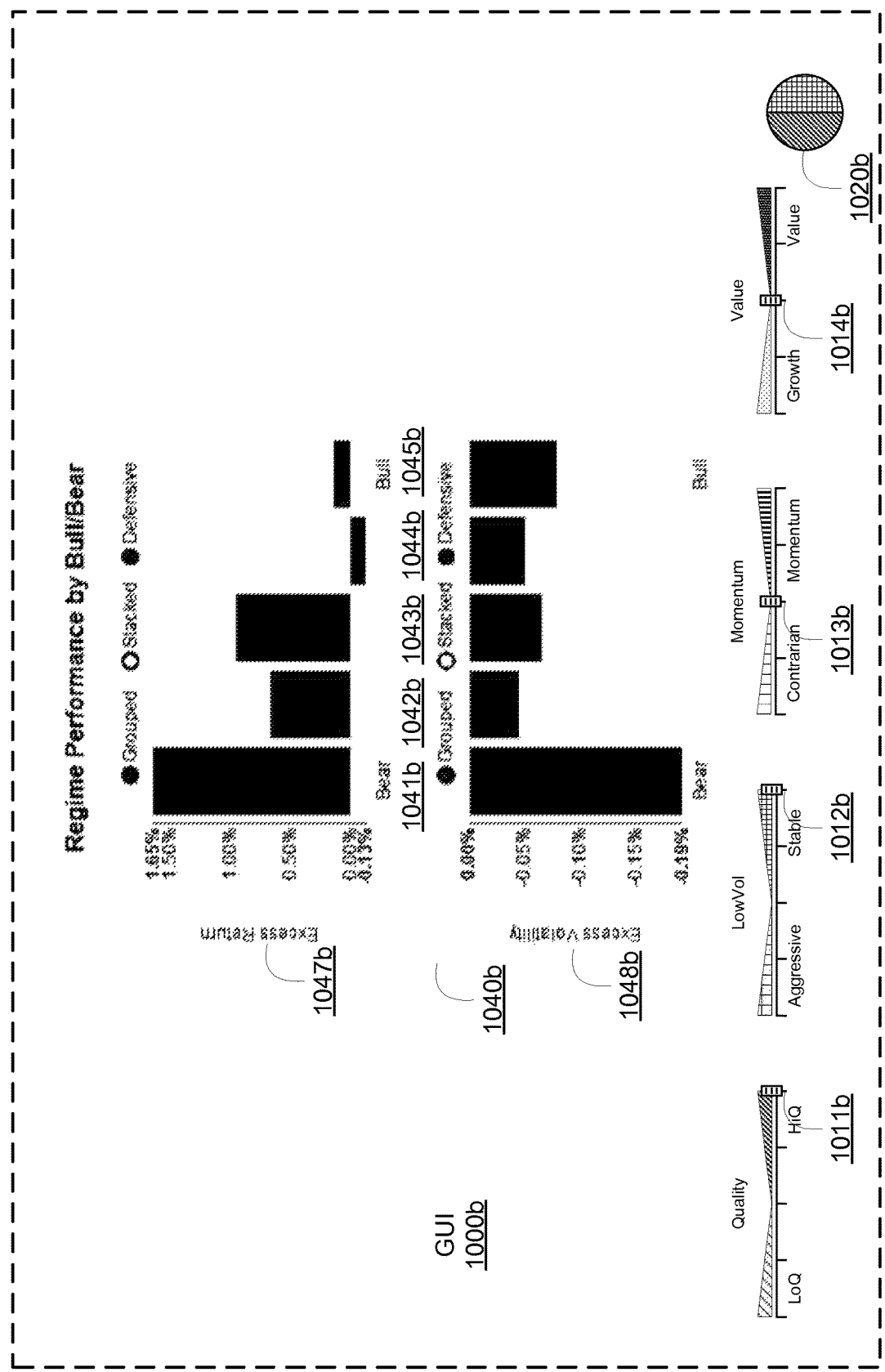

In FIG. 10B, a preset "Defensive" blended portfolio is evaluated across the same five bull/bear market regimes as in FIG. 10A. As shown in FIG. 10B, a portion of a graphical user interface (GUI) 1000b comprises graphical elements including factor controls 1011b, 1012b, 1013b, and 1014b. GUI 1000b further comprises graphical form 1020b and regime metric 1040b. Graphical form 1020b is a graphical representation of a blended portfolio that is defined by the positions of the factor controls 1011b, 1012b, 1013b, and 1014b. As shown here, graphical form 1020b is a pie chart comprising 50% of a "HiQ" factor portfolio and 50% of a "Stable" factor portfolio, and is also illustrated in FIG. 4A. The regime metric 1040b is a graphical representation of the measure of an evaluation of a selected portfolio across a number of regimes for a selected characteristic or market condition. In this case, regime metric 1040b comprises bar graphs 1047b and 1048b which illustrate excess return and excess volatility for the Defensive portfolio depicted by graphical form 1020b across regimes 1041b, 1042b, 1043b, 1044b, and 1045b. The regimes 1041b-1045b represent a range of market conditions from "bear" to "bull" as shown.

Figure 10C:
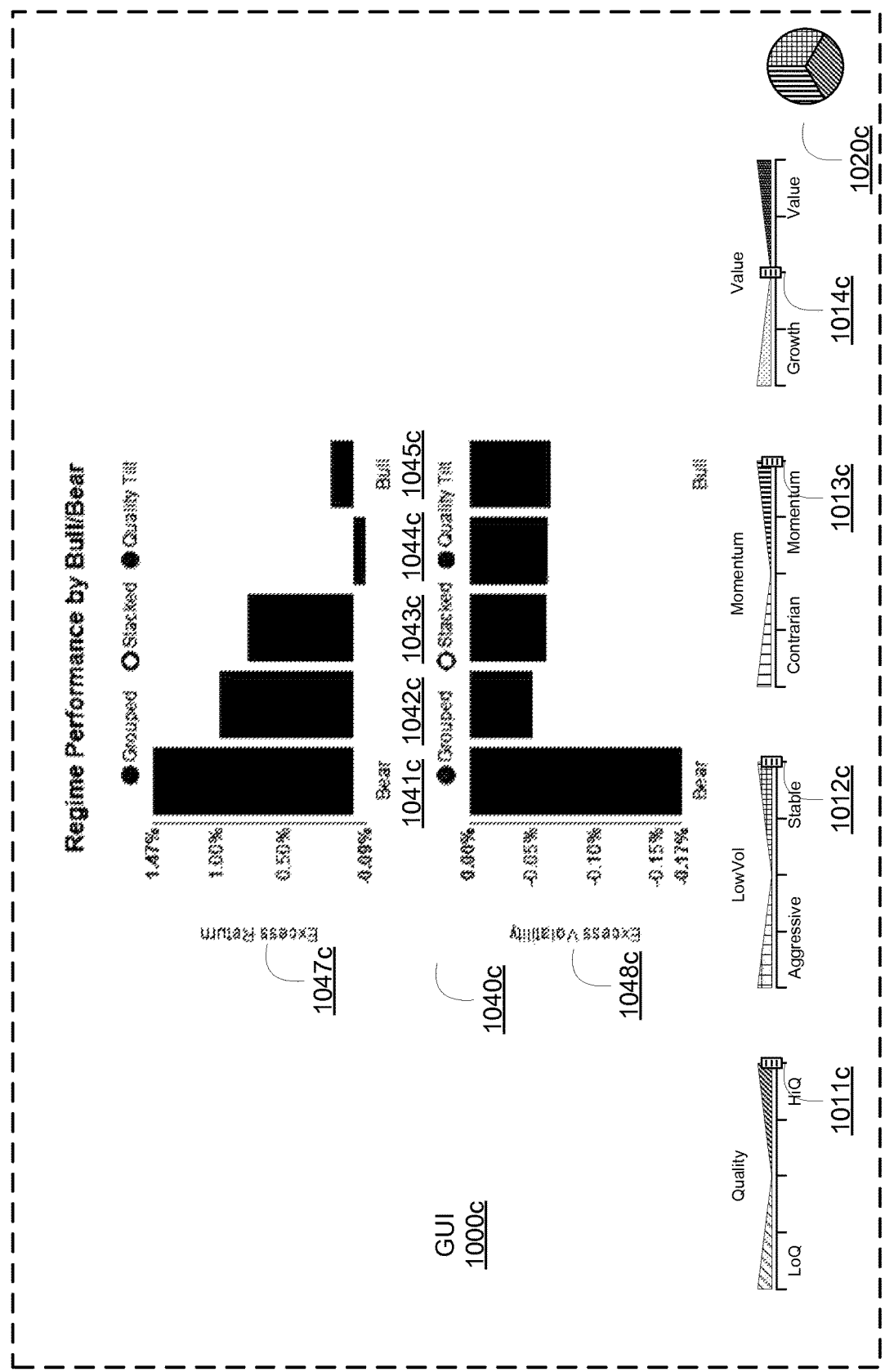

In FIG. 10C, a preset "Quality Tilt" blended portfolio is evaluated across the same five bull/bear market regimes as in FIG. 10A. As shown in FIG. 10C, a portion of a graphical user interface (GUI) 1000c comprises graphical elements including factor controls 1011c, 1012c, 1013c, and 1014c. GUI 1000c further comprises graphical form 1020c and regime metric 1040c. Graphical form 1020c is a graphical representation of a blended portfolio that is defined by the positions of the factor controls 1011c, 1012c, 1013c, and 1014c. As shown here, graphical form 1020c is a pie chart comprising 33.3% of a "HiQ" factor portfolio, 33.3% of a "Stable" factor portfolio, and 33.3% of a "Value" factor portfolio, and is also illustrated in FIG. 4B. The regime metric 1040c is a graphical representation of the measure of an evaluation of a selected portfolio across a number of regimes for a selected characteristic or market condition. In this case, regime metric 1040c comprises bar graphs 1047c and 1048c which illustrate excess return and excess volatility for the Quality Tilt portfolio depicted by graphical form 1020c across regimes 1041c, 1042c, 1043c, 1044c, and 1045c. The regimes 1041c-1045c represent a range of market conditions from "bear" to "bull" as shown.

Figure 10D:
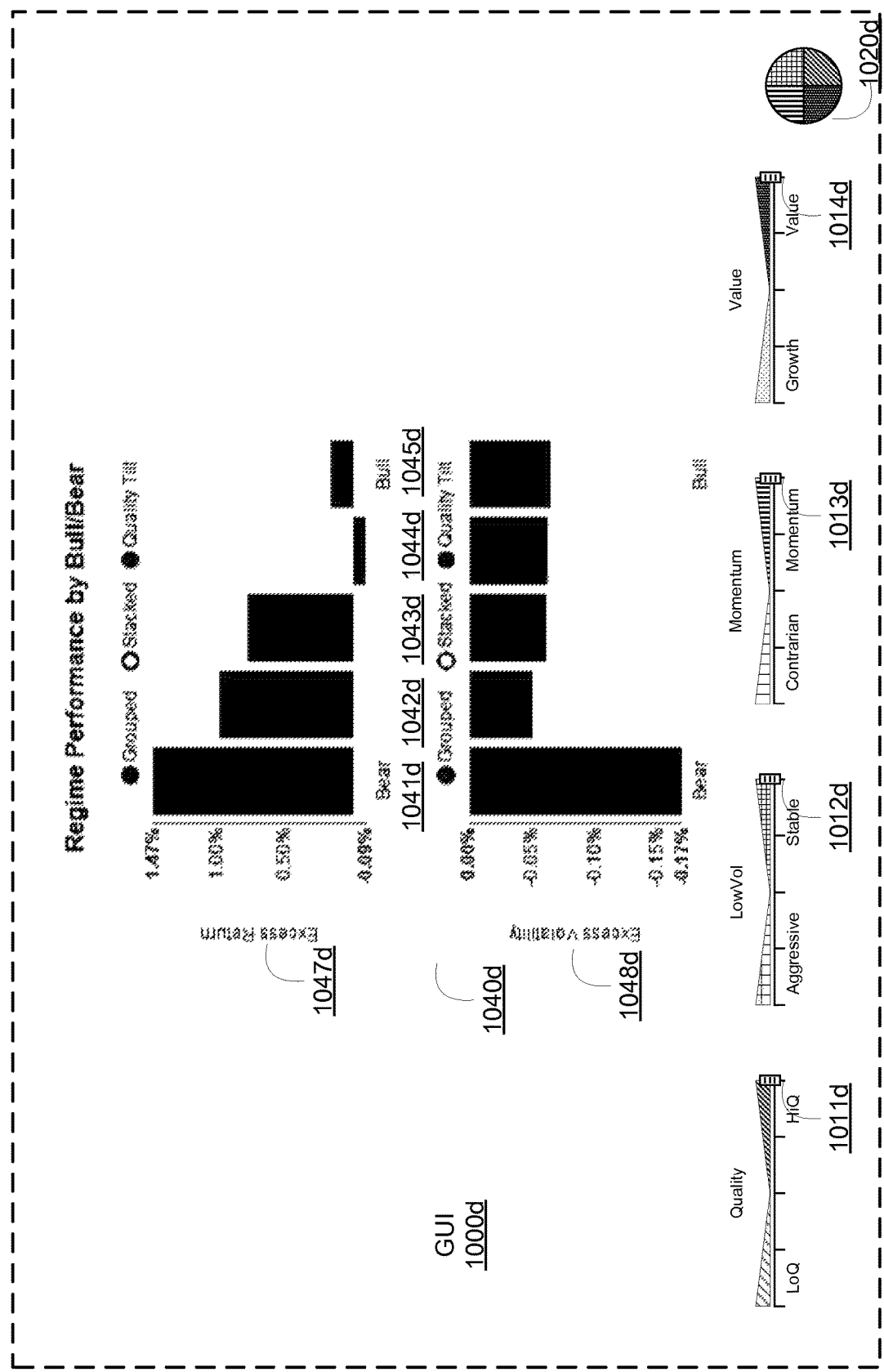

In FIG. 10D, a preset "Premia Harvest" blended portfolio is evaluated across the same five bull/bear market regimes as in FIG. 10A. As shown in FIG. 10D, a portion of a graphical user interface (GUI) 1000d comprises graphical elements including factor controls 1011d, 1012d, 1013d, and 1014d. GUI 1000d further comprises graphical form 1020d and regime metric 1040d. Graphical form 1020d is a graphical representation of a blended portfolio that is defined by the positions of the factor controls 1011d, 1012d, 1013d, and 1014d. As shown here, graphical form 1020d is a pie chart comprising 25% of a "HiQ" factor portfolio, 25% of a "Stable" factor portfolio, 25% of a "Value" factor portfolio, and 25% of a "Momentum" factor portfolio, and is also illustrated in FIG. 4C. The regime metric 1040d is a graphical representation of the measure of an evaluation of a selected portfolio across a number of regimes for a selected characteristic or market condition. In this case, regime metric 1040d comprises bar graphs 1047d and 1048d which illustrate excess return and excess volatility for the Balanced portfolio depicted by graphical form 1020d across regimes 1041d, 1042d, 1043d, 1044d, and 1045d. The regimes 1041d-1045d represent a range of market conditions from "bear" to "bull" as shown.

The method 900 illustrated in FIG. 9 and described herein may be used to evaluate a portfolio according to a wide variety of selected characteristics. In addition to the examples of market return and market volatility illustrated and described with respect to FIGS. 10A-10D, market conditions including factor performance can be examined. In other words each of the factors listed in TABLE II can be a selected characteristic for which various regimes can exist. For example, each quarter of historical asset data can be grouped according to the quarterly performance of a particular factor. One regime may represent, for example, the quarters in which High Quality stocks perform well or outperform Low Quality stocks, while another regime may represent the quarters in which Low Quality stocks outperform High Quality Stocks. Still a third regime may represent the quarters in which High Quality Stocks and Low Quality stocks performed comparably. An investor can thus use such regime analysis to evaluate the resulting effects on the chosen portfolio under different scenarios and may tailor proportions of factor portfolios in a blended portfolio accordingly. In other embodiments, macroeconomic data such as changes in CPI, changes in industrial production, unemployment rate, interest rates, and inflation can be used as selected characteristics for regime analysis. Such macroeconomic data may be obtained from external sources or service providers. Performing regime analysis using such macroeconomic data can show a user how a given factor portfolio or blended portfolio may perform in light of certain economic conditions.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A computer-implemented method for interactive visualization of a blended portfolio from a plurality of factor portfolios, the method comprising:
electronically storing a plurality of data entities in a server database of a server, wherein each data entity comprises a weighted combination of assets selected to exhibit risk premia factors and represents a computerized representation of at least one of a constituent factor portfolio and a grouping of factor portfolios, the constituent factor portfolio comprises a mix of individual assets that are tradable financial securities;
retrieving the data entities over a computer network from the server database using a server application of the server;
executing instructions stored in memory, wherein execution of the instructions by a processor of the server generates a graphical user interface that displays at least part of the retrieved data entities;
executing a construction and analysis tool that resides on the server that filters the data entities, wherein the construction and analysis tool is displayed within the graphical user interface;
executing the server application to gather dynamic asset information from at least one financial source and to update the information in the data entities, wherein the dynamic asset information is gathered from the at least one financial source over the computer network to represent a current market pricing of the data entities;
displaying the filtered and updated data entities within the graphical user interface;
receiving user input made using the graphical user interface for controlling proportions of constituent factor portfolios in a blended portfolio, wherein the user input is made through interactive manipulation of the construction and analysis tool displayed within the graphical user interface;
generating, using the processor of the server, the blended portfolio as a weighted combination of the constituent data entities according to the user input by converting the user input into relative proportions;
generating, using the processor of the server, a visual representation of the blended portfolio that shows the relative proportions of the data entities within the graphical user interface;
generating, within the graphical user interface, a visual representation of performance metrics of the individual assets in the blended portfolio based on aggregating the performance metrics of the blended portfolio, wherein the graphic user interface includes a plurality of slider or dial controls, wherein the slider or dial controls allow a user to interactively adjust exposure to Quality, Low Volume, Momentum, and Value factors by moving a movable object within the slider or dial control from one position to another position; wherein the graphical user interface uses the interactive adjustment to transform the visual representation of the blended portfolio, wherein the shown proportions within the visual representation of the blended portfolio is changed based on the user's movement of the movable object;
using the construction and analysis tool displayed within the graphical user interface to perform data analysis using the blended portfolio and a benchmark portfolio, wherein the data analysis includes comparing performance metrics of the blended portfolio with performance metrics of the benchmark portfolio;
rebalancing the performance metrics of the blended portfolio based on comparison, wherein rebalancing the performance metrics of the blended portfolio includes tweaking the visual representation in accordance with at least one performance metric within the graphical user interface;
storing the modified blended portfolio into the server database; and
executing the blended portfolio by generating an electronic trading order as a listing of each individual asset and a corresponding relative proportion of each individual asset in the blended portfolio, and executing the trading order by transferring equities or money from one account to another account in a series of transactions in order to build the blended portfolio.

2. The computer-implemented method of claim 1, further comprising generating a set of data entities from a universe of assets by:
- selecting a universe of assets from the server database, wherein each of the assets is a tradable security;
- selecting a first factor and a second factor;
- calculating a first factor score and a second factor score for each asset using historical fundamental asset information;
- creating a first ranking of the assets based on the first factor score calculated for each asset and a second ranking of the assets based on the second factor score calculated for each asset;
- generating a first factor portfolio by selecting a first subset of the assets using the first ranking; and
- generating a second factor portfolio by selecting a second subset of the assets using the second ranking.

3. The computer implemented method of claim 2, wherein the first factor and the second factor each includes at least one of membership in a geographic region, membership in an industry, size, quality, low volatility, momentum, and value.

4. The computer implemented method of claim 2, wherein selecting the first subset of the assets using the first ranking comprises selecting from a top portion of the first ranking.

5. The computer implemented method of claim 2, wherein selecting the first subset of the assets using the first ranking comprises selecting from a bottom portion of the first ranking.

6. The computer implemented method of claim 2, further comprising:
- generating a third factor portfolio by selecting a third subset of the assets using the first ranking, wherein the first factor portfolio comprises assets from a top portion of the first ranking and the third factor portfolio comprises assets from a bottom portion of the first ranking; and
- generating a fourth factor portfolio by selecting a fourth subset of the assets using the second ranking, wherein the second factor portfolio comprises assets from a top portion of the second ranking and the fourth factor portfolio comprises assets from a bottom portion of the second ranking.

7. The computer implemented method of claim 2, wherein rebalancing is performed on at least one data entity using updated fundamentals and stock exchange asset information.

8. A non-transitory computer-readable storage medium having embodied thereon computer-readable instructions executable by a processor to perform a method for interactive visualization of a blended portfolio of factor portfolios, the method comprising:
- electronically storing a plurality of data entities in a server database of a server, wherein each data entity comprises a weighted combination of assets selected to exhibit risk premia factors and represents a computerized representation of at least one of a constituent factor portfolio and a grouping of factor portfolios, the constituent factor portfolio comprises a mix of individual assets that are tradable financial securities;
- retrieving the data entities over a computer network from the server database using a server application of the server;
- executing instructions stored in memory, wherein execution of the instructions by a processor of the server generates a graphical user interface that displays at least part of the retrieved data entities;
- executing a construction and analysis tool that resides on the server that filters the data entities, wherein the construction and analysis tool is displayed within the graphical user interface;
- executing the server application to gather dynamic asset information from at least one financial source and to update the information in the data entities, wherein the dynamic asset information is gathered from at least one financial source over the computer network to represent a current market pricing of the data entities;
- displaying the filtered and updated data entities within the graphical user interface;
- receiving user input made using the graphical user interface for controlling proportions of constituent factor portfolios in a blended portfolio, wherein the user input is made through interactive manipulation of the construction and analysis tool displayed within the graphical user interface;
- generating, using the processor of the server, the blended portfolio as a weighted combination of the constituent data entities according to the user input by converting the user input into relative proportions;
- generating, using the processor of the server, a visual representation of the blended portfolio that shows the relative proportions of the data entities within the graphical user interface;
- generating, within the graphical user interface, a visual representation of performance metrics of the individual assets in the blended portfolio based on aggregating the performance metrics of the blended portfolio, wherein the graphic user interface includes a plurality of slider or dial controls, wherein the slider or dial controls allow a user to interactively adjust exposure to Quality, Low Volume, Momentum, and Value factors by moving a movable object within the slider or dial control from one position to another position; wherein the graphical user interface uses the interactive adjustment to transform the visual representation of the blended portfolio, wherein the shown proportions within the visual representation of the blended portfolio is changed based on the user's movement of the movable object;
- using the construction and analysis tool displayed within the graphical user interface to perform data analysis using the blended portfolio and a benchmark portfolio, wherein the data analysis includes comparing performance metrics of the blended portfolio with performance metrics of the benchmark portfolio;
- rebalancing the performance metrics of the blended portfolio based on the comparison, wherein rebalancing the performance metrics of the blended portfolio includes tweaking the visual representation in accordance with at least one performance metric within the graphical user interface;
- storing the modified blended portfolio into the server database;
- executing the blended portfolio by generating an electronic trading order as a listing of each individual asset and a corresponding relative proportion of each individual asset in the blended portfolio, and executing the trading order by transferring equities or money from one account to another account in a series of transactions in order to build the blended portfolio.

9. The non-transitory, computer-readable medium of claim 8, further comprising instructions executable to generate a set of data entities from a universe of assets by:
- selecting a universe of assets from the server database, wherein each of the assets is a tradable security;

selecting a first factor and a second factor;

calculating a first factor score and a second factor score for each asset using historical fundamental asset information;

creating a first ranking of the assets based on the first factor score calculated for each asset and a second ranking of the assets based on the second factor score calculated for each asset;

generating a first factor portfolio by selecting a first subset of the assets using the first ranking; and generating a second factor portfolio by selecting a second subset of the assets using the second ranking.

10. The non-transitory, computer-readable medium of claim 9, wherein the first factor and the second factor each includes at least one of membership in a geographic region, membership in an industry, size, quality, low volatility, momentum, and value.

11. The non-transitory, computer-readable medium of claim 9, wherein selecting the first subset of the assets using the first ranking comprises selecting from a top portion of the first ranking.

12. The non-transitory, computer-readable medium of claim 9, wherein selecting the first subset of the assets using the first ranking comprises selecting from a bottom portion of the first ranking.

13. The non-transitory, computer-readable medium of claim 9, wherein generating a set of constituent factor portfolios from a universe of assets further comprises:

generating a third factor portfolio by selecting a subset of the assets using the first ranking, wherein the first factor portfolio comprises assets from a top portion of the first ranking and the third factor portfolio comprises assets from a bottom portion of the first ranking; and generating a fourth factor portfolio by selecting a subset of the assets using the second ranking, wherein the second factor portfolio comprises assets from a top portion of the second ranking and the fourth factor portfolio comprises assets from a bottom portion of the second ranking.

14. The non-transitory, computer-readable medium of claim 9, wherein rebalancing is performed on at least one data entity using updated fundamentals and stock exchange asset information.

15. A computer-implemented method for interactive visualization of a selected portfolio of assets across a range of regimes, the method comprising:

electronically storing a plurality of data entities in a server database of a server, wherein each data entity comprises a weighted combination of assets selected to exhibit risk premia factors and represents a computerized representation of at least one of a constituent factor portfolio and a grouping of factor portfolios, the constituent factor portfolio comprises a mix of individual assets that are tradable financial securities;

retrieving the data entities over a computer network from the server database using a server application of the server;

executing instructions stored in memory, wherein execution of the instructions by a processor of the server generates a graphical user interface that displays at least part of the retrieved set of historical data;

dividing the retrieved set of historical data into a number of time-based intervals;

calculating from the retrieved set of historical data for each interval an interval score representing a measure of a selected characteristic;

categorizing the intervals into a number of regimes based on the interval scores;

calculating for each regime a composite regime score for the selected portfolio by calculating an individual score for each asset in the portfolio for the selected characteristic during each of the time-based intervals and aggregating the individual scores across the intervals within each regime; and updating the graphical user interface in accordance with the calculated regime score for each regime.

16. The computer-implemented method of claim 15, wherein the selected characteristic is one of a measure of market returns, market volatility, factor performance, consumer price index, industrial production, unemployment rate, interest rates, and inflation.

\* \* \* \* \*